(12) United States Patent
Dang

(10) Patent No.: US 10,693,335 B2
(45) Date of Patent: Jun. 23, 2020

(54) MODIFIED STATOR LEADS AND METHODS OF JOINING STATOR LEADS

(71) Applicant: Faraday & Future Inc., Gardena, CA (US)

(72) Inventor: Dang Dinh Dang, Garden Grove, CA (US)

(73) Assignee: Faraday & Future Inc., Gardena, CA (US)

(*) Notice: Subject to any disclaimer, the term of this patent is extended or adjusted under 35 U.S.C. 154(b) by 389 days.

(21) Appl. No.: 15/284,211

(22) Filed: Oct. 3, 2016

(65) Prior Publication Data

US 2018/0097417 A1  Apr. 5, 2018

(51) Int. Cl.
*H02K 3/04* (2006.01)
*H02K 3/28* (2006.01)
*H02K 15/00* (2006.01)
*H02K 3/50* (2006.01)

(52) U.S. Cl.
CPC .............. *H02K 3/28* (2013.01); *H02K 3/505* (2013.01); *H02K 15/0043* (2013.01); *H02K 15/0081* (2013.01); *H02K 2203/06* (2013.01); *H02K 2203/09* (2013.01)

(58) Field of Classification Search
CPC ...................... H02K 2203/06; H02K 2203/09
See application file for complete search history.

(56) References Cited

U.S. PATENT DOCUMENTS

2010/0060090 A1* 3/2010 Sakata ................... H02K 3/522
                                                                310/71
2014/0183993 A1* 7/2014 Takasaki ................. H02K 3/50
                                                                310/71

* cited by examiner

*Primary Examiner* — Ramon M Barrera
(74) *Attorney, Agent, or Firm* — Knobbe Martens Olson & Bear, LLP

(57) ABSTRACT

Certain aspects relate to systems and methods to join leads of stator windings to components of an electric machine, such as a bus bar of a stator of the electric machine. Systems and methods include modifying a surface of the lead and laser welding the surface-modified lead to the bus bar. Systems and methods can include reducing the reflectivity of the lead by imparting a non-smooth surface on the lead, thereby allowing a laser to deliver concentrated energy onto the lead. The surface-modified lead can include knurled surface, a pattern of raised grooves stamped into the surface of the lead, or a roughened surface.

11 Claims, 11 Drawing Sheets

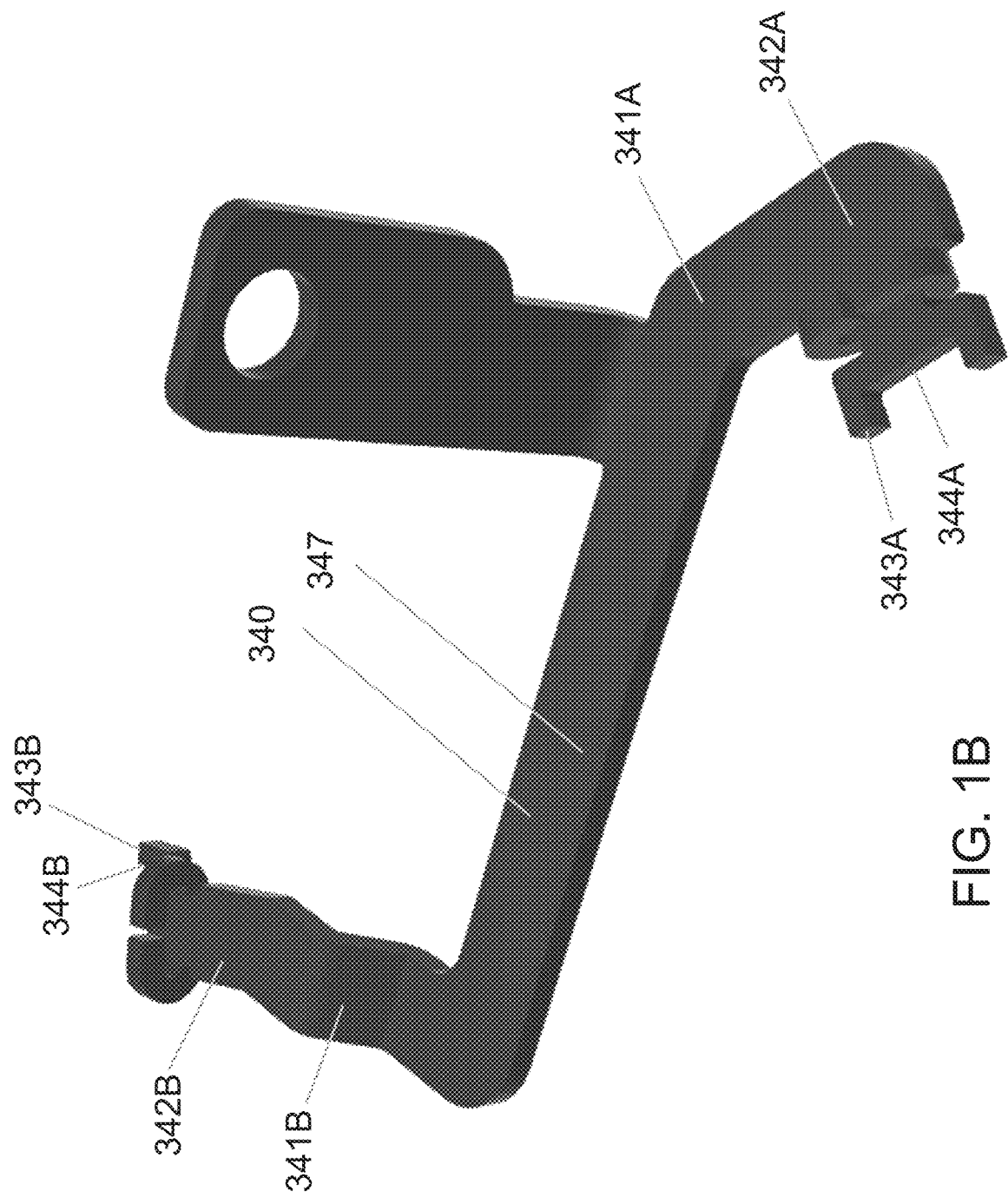

MODIFIED STATOR LEADS AND METHODS OF JOINING STATOR LEADS

TECHNICAL FIELD

The systems and methods disclosed herein are directed toward stator leads, and, more particularly, modified stator leads and methods of joining stator leads to bus bars for an electrical machine.

BACKGROUND

Electrical machines include both electric motors and electric generators. In recent years, high efficiency electric motors have become desirable to meet the challenges of providing power without the usage of fossil fuel sources, for example in hybrid and electric vehicles. Interior permanent magnet (IPM) motors have become popular due to their high efficiency performance, as IPM electric machines have become increasingly efficient synchronous motors due to advances in high-energy permanent magnet technology, smart inverters, and digital controllers. IPM electric machines have magnets built into the interior of the rotor. The rotor is rotatable within a stator which includes multiple stator windings to produce a rotating magnetic field in the frame of reference of the stator.

SUMMARY

The stator leads and the bus bar arrangements disclosed herein have several features, no single one of which is solely responsible for its desirable attributes. Without limiting the scope as expressed by the claims that follow, the more prominent features of the design will now be discussed briefly. After considering this discussion, and particularly after reading the section entitled "Detailed Description" one will understand how the features of the stator leads and the bus bar arrangements provide several advantages over traditional systems and methods.

In some embodiments, an electric machine is provided. The electric machine can include a stator having a plurality of stator slots. The electric machine can include a plurality of stator windings placed within the plurality of stator slots, each of the plurality of stator windings having a lead extending beyond an end face of the stator. The electric machine can include a bus bar in physical contact with a first surface of a lead of a stator winding of the plurality of stator windings. In some embodiments, a second surface of the lead opposite the first surface comprises a surface modification.

In some embodiments, the surface modification comprises a knurled surface, a pattern of raised grooves stamped into the top surface, or a roughened surface. In some embodiments, the bus bar comprises a planar branch. In some embodiments, the bus bar comprises a leg extending from the planar branch, the leg having a slot sized to receive the lead of the stator winding. In some embodiments, the bus bar comprises a connection terminal extending from the planar branch for receiving one of three phases of electric current. In some embodiments, the leg of the bus bar is in physical contact with the first surface of the lead of the stator winding. In some embodiments, the leads of a first subset of the plurality of windings are laser welded to the bus bar to receive a first phase of the three phases of electric current. In some embodiments, the leads of a second subset of the plurality of windings are laser welded to a second bus bar of the electric machine to receive a second phase of the three phases of electric current. In some embodiments, the bus bar comprises a second leg extending from the planar branch, the second leg having a second slot sized to receive a lead of at least one of the plurality of stator windings. In some embodiments, the slot is sized to receive a single lead. In some embodiments, the slot is sized to receive three leads, and wherein the bus bar is in physical contact with first surfaces of each of the three leads received in the slot. The electric machine can include a clip configured to hold the bus bar in physical contact with the first surface of the lead of the stator winding. The electric machine can include a second bus bar and a third bus bar, the bus bars positioned in a stack from a top-down perspective orthogonal to the end face of the stator. In some embodiments, each of the plurality of stator windings is a continuous winding comprising a plurality of leg portions each positioned in one of the plurality of stator slots and a plurality of crowns connecting successive leg portions of the plurality of leg portions, the crowns extending above the end face of the stator.

In some embodiments, a method of joining a stator winding to a bus bar of a stator is provided. The method can include the step of positioning a lead of a stator winding beyond an end face of a stator. The method can include the step of bending the stator winding to position a portion of the lead of the stator winding in contact with a bus bar. The method can include the step of modifying a surface of the lead, the modified surface opposite the portion of the lead in contact with the bus bar. The method can include the step of laser welding the lead of the stator winding to the bus bar.

In some embodiments, bending the stator winding comprises forming an L-shaped bend in the stator winding. The method can include the step of clipping the portion of the lead in contact with the bus bar to the bus bar. In some embodiments, modifying a surface of the lead comprises knurling the surface of the lead. In some embodiments, laser welding the lead of the stator winding to the bus bar does not comprise applying solder to the stator winding. In some embodiments, negligible heat is generated when the stator winding is laser welded to the bus bar. In some embodiments, the lead of the stator winding comprises metal. In some embodiments, the lead of the stator winding comprises copper.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIGS. 1A and 1B illustrate perspective views of a neutral bus bar and a phase lead bus bar according to one embodiment.

DETAILED DESCRIPTION

Introduction

Figure 1A:
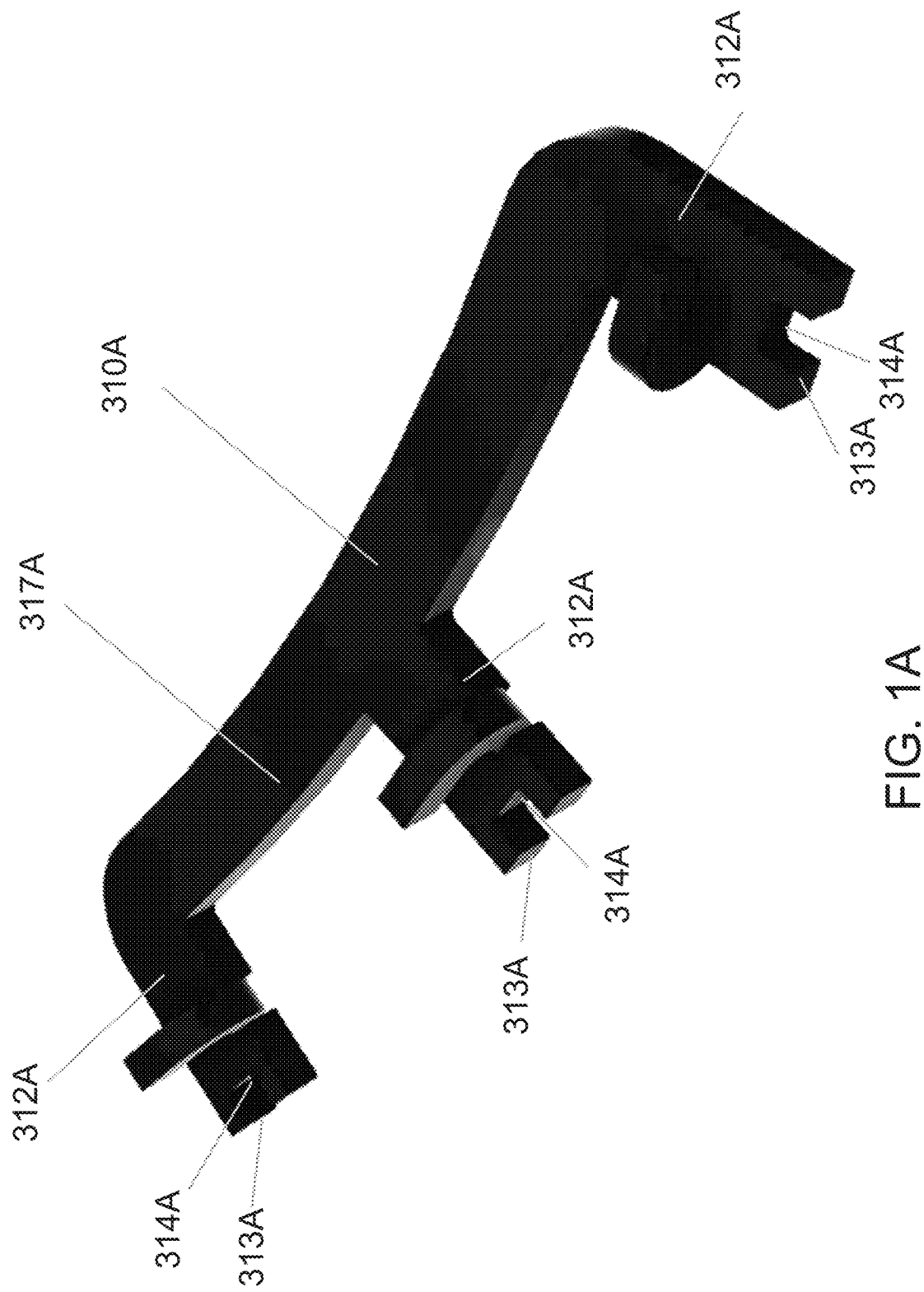

Embodiments of the disclosure relate to stator windings and bus bar arrangements, as well as methods for joining the stator windings to the bus bar arrangements. Each stator winding includes stator leads, including a phase lead and a neutral lead. The bus bar arrangement can include a three-phase bus bar arrangement and a neutral bus bar arrangement. The three-phase bus bar arrangement can provide three phases of electric current to the phase leads of stator windings connected thereto. The neutral bus bar arrangement can connect to the neutral leads of the stator windings. The methods for joining the stator leads to the bus bar arrangement can include a method of preparing the stator leads for laser welding. The methods for joining the stator leads to the bus bar arrangement can include modifying a surface of the stator leads prior to laser welding the stator leads to the bus bar arrangement.

The disclosed stator windings and the bus bar arrangements can be used with any suitable electric motor or generator. The disclosed embodiments will be described primarily in the context of the electric motor, however the disclosed concepts can also be applied to an electric generator. Further, in addition to use in electric machines, the stator windings and the bus bar arrangements described herein can be used for other multi-phase electrical applications. The methods for joining the stator windings to the bus bar arrangements can be used for other multi-phase electrical applications, in addition to use in electric machines.

The phase bus bar arrangement can direct current from a power supply to the conductive stator windings. The phase bus bar arrangement can distribute the current to a number of stator windings. In the illustrated examples, each phase lead bus bar of the three-phase bus bar arrangement can distribute current to six stator windings. In the illustrated examples, the three-phase bus bar arrangement can distribute current to eighteen stator windings. Other configurations are possible.

The stator windings and the bus bar arrangements are formed from conductive materials. As one example the three-phase bus bar arrangement can comprise copper. The stator windings can comprise a conductor and an electrically insulating coating. The conductor of the stator windings can comprise copper. The stator winding can include one phase lead and one neutral lead. The phase lead can be an input for electrical current and the neutral lead can be an output for electrical current. The electrically insulating coating may not extend to the leads, such that a portion of the stator winding near each lead is exposed from the electrically insulating coating. The phase lead of the stator winding can form an electrical connection with the corresponding phase lead bus bar of the three-phase bus bar arrangement. The neutral lead of the stator winding can form an electrical connection with a neutral bus bar of the neutral bus bar arrangement.

The bus bar arrangement can include a structure to facilitate the joining of the stator windings and the bus bar arrangement. In the illustrated embodiments, each phase lead bus bar can include one or more slots. The slot can form an aperture for receiving one or more phase leads. In the illustrated embodiments, each phase lead bus bar can include one or more slots. In the illustrated embodiments, terminal ends of the phase lead bus bar can include one or more projections. The projections can form a slot configured to receive the phase leads. The slot can take different forms. The slot can include three borders. The slot can include can include at least one open side. In some cases, the slots are completely enclosed. In one example, the slot is encircled by the phase lead bus bar. In the illustrated embodiments, the neutral bus bars can include one or more slots configured to receive the neutral leads of the stator windings.

The stator windings can include a bend to facilitate the joining of the stator windings and the bus bar arrangement. The stator windings can extend beyond a first end face of the stator when viewed orthogonally to the first end face of the stator. As described herein, a stator winding can include a bend so that a portion of the stator winding extends in a plane generally parallel to the first end face of the stator. In some embodiments, the stator winding can include a bend so that a portion of the stator winding extends radially inward from the backiron of the stator. In some embodiments, the stator winding includes a bend so that a portion of the stator winding extends radially outward toward the backiron of the stator. The stator windings can include a bend such that the lead can be in direct physical contact with a portion of a phase lead bus bar or a neutral bus bar. The lead may lie flat or generally flat on the portion of the phase lead bus bar or the neutral bus bar.

The bus bars can include a clip to facilitate the joining of the stator windings and the bus bar arrangement. The clip may be integral with the bus bar, or it may be physically separate from the bus bar. The clip can apply a compressive force on one or more leads of stator windings. The clip can at least partially encircle the portion of the leads of one or more stator windings that are in contact with a bus bar. The clip can at least partially enclose the portion of the leads of one or more stator windings that are in contact with a bus bar. The clip can maintain the position of the leads of the one or more stator windings relative to the bus bar arrangement. The clip can maintain the leads of one or more stator windings stationary relative to the bus bar arrangement. The clip can ensure that the leads of the one or more stator windings can lie flat or generally flat on a portion of a phase lead bus bar or a neutral bus bar.

The lead, or a portion thereof, can include a surface modification to facilitate joining of the stator windings and the bus bar arrangement. The lead, or a portion thereof, can have any non-smooth surface. The lead, or a portion thereof, can be roughened. The lead, or a portion thereof, can include any irregular surface. The lead, or a portion thereof, can include any surface marked by irregularities, protuberances, or ridges. The lead, or a portion thereof, can include any uneven or coarse surface. The lead, or a portion thereof, can be knurled. As used herein, knurled can include any surface produced by imparting a pattern of straight, angled, or crossed lines into the material. The process of knurling can be a manufacturing process. The process of knurling can include cutting or rolling the pattern into the material. The process of knurling can produce projections and indentations on the lead, or a portion thereof. The process of knurling can alter the originally smooth metal surface of the lead, or a portion thereof. The process of knurling can produce any pattern which increases the absorptivity of laser energy as described herein.

The lead can include one or more surfaces. In some embodiments, the phase lead can include a top surface and a bottom surface. The neutral lead can include a top surface and a bottom surface. The top surface of the lead can be the furthest surface from the first end face of the stator when viewed orthogonally to the first end face. The bottom surface of the lead can be the closest surface to the first end face of the stator when viewed orthogonally to the first end face. In one configuration, the bottom surface of the lead can be in direct physical contact with a portion of the phase lead bus bar or the neutral bus bar. For example, the bus bar to which the lead is coupled can include a top surface (the surface furthest from the first end face of the stator when viewed orthogonally to the first end face) and a bottom surface (the surface closest to the first end face of the stator when viewed orthogonally to the first end face). The bottom surface of the lead can be in direct physical contact with the top surface of the bus bar to which the lead is coupled (such as the top surface of a leg of the bus bar). In some cases, the bottom surface of the lead can lie flat or generally flat on a top surface of a corresponding bus bar. The top surface of the lead can be generally parallel to, and spaced apart from, the phase lead bus bar or neutral bus bar. The top surface of the lead, or a portion thereof, can include a surface modification as described herein. In a different configuration, the top surface of the lead can be in direct physical contact with a portion of the phase lead bus bar or the neutral bus bar. The top surface of the lead can be in direct physical contact with the bottom surface of the bus bar to which the lead is coupled. In some cases, the top surface of the lead can lie flat or generally flat on a bottom surface of a corresponding bus bar. The bottom surface of the lead can be generally parallel to, and spaced apart from, the phase lead bus bar or neutral bus bar. The bottom surface of the lead, or a portion thereof, can include a surface modification as described herein. In some embodiments, only the top surface of the lead includes a surface modification. In some embodiments, only the bottom surface of the lead includes a surface modification. Neutral leads and neutral bus bars can include any of the features of phase leads and phase lead bus bars described herein.

The configurations of the stator windings and the bus bar arrangement described herein can allow for joining of the stator windings and the bus bar arrangement by laser welding. Systems and methods of modifying surfaces of stator windings as described herein advantageously allow laser welding to be used to join stator windings to bus bar arrangements. Stator leads that do not have surface modifications described herein would have low absorptivity of the infrared light. Such stator leads may fail to form suitable welds due to the low absorptivity. Stator leads that do not include surface modifications described herein would reflect the laser light, such that the application of high powered laser light could cause damage to components of the electric machine or the laser. In the absence of systems and methods for laser welding described herein, the high thermal conductivity of the leads makes it difficult to control the melt of the leads of the stator windings. Systems and methods described herein address these and other challenges.

An advantage of the method of laser welding described herein can include the ability to create a weld with adequate penetration between parts. Another advantage of the method of laser welding described herein can include the ability to vary the length of the weld. The method of laser welding can allow for tip or ball welds. The method of laser welding can allow for continuous welds, for instance continuous welds over two or more leads. In the illustrate embodiments, three phase leads are joined to the phase lead bus bar at each location. The ability to form a continuous weld over three phase leads joined at each location can increase the speed of production. An additional advantage of the method of laser welding described herein can include the ability to weld a wide variety of materials. Another advantage of the method of laser welding described herein can include the ability to modify the welding process for a wide variety of joining applications.

An advantage of the method of laser welding described herein can include the ability create a weld quickly. Embodiments described herein can include an instantaneous or nearly instantaneous weld. The weld can be completed in a few microseconds. The process of laser welding described herein can create an instantaneous weld, which cools in microseconds (e.g., less than five microseconds, less than ten microseconds, less than twenty microseconds, less than thirty microseconds, less than forty microseconds, less than fifty microseconds, less than sixty microseconds, less than seventy microseconds, less than eighty microseconds, less than ninety microseconds, etc.). An advantage of the method of laser welding described herein can include the ability to generate zero or almost zero heat. An advantage of the method of laser welding described herein can include the ability to have a small heat affect zone. The laser can produce a small heat affect zone so that adjacent or surrounding parts of the stator assembly are not heated or negligibly heated. The stator windings and the bus bar arrangement can advantageously be handled immediately or almost immediately after welding. An advantage of the method of laser welding described herein can include the ability to not distort the associated stator windings and the bus bar arrangement. The minimal heat generated can be insufficient to distort the welded parts. The stator windings and the bus bar arrangement can have zero or almost zero distortion.

Another advantage of the method of laser welding described herein is that the weld does not include consumable materials. Other welding techniques can include solder, horn, electrode, or other consumable material. An advantage of the method of laser welding described herein is the ability to not introduce foreign material into the electric machine during manufacture of the machine. The method can include welding the leads and the bus bar arrangement. The weld can consist only of the material of the leads and the bus bar arrangement. As described herein, the leads and the bus bar arrangement can comprise copper. In this example, the weld can consist only of copper. Another advantage of the method of laser welding described herein is that a shielding gas is not required. Other welding techniques can require a shielding gas to prevent oxidation.

An advantage of the method of laser welding described herein is the ability to join components given the geometry of the stator, and challenges associated with joining equipment accessing the components to be joined. In some embodiments, the method can include no mechanical contact with or direct force applied to the leads and the bus bar arrangement during welding. In some embodiments, the method does not include use of a vacuum or vacuum chamber. In some embodiments, the method does not require complex set up, including for instance, loading the stator in a vacuum chamber. The method can be performed after the stator windings are placed in direct physical contact with the bus bar arrangement. The method can be performed after the stator windings are inserted into the stator.

An advantage of the method of laser welding is that the process can be repeatable and reliable. Another advantage of the method of laser welding described herein is that the process can be fast. The method can be suitable for a high production rate. An advantage of the method of laser welding described herein is that the process does not require separate set up for each weld.

Methods of laser welding described herein can be part of a process to produce an electric motor. The electric motor can include a stator having a number of conductive stator windings wound through the stator to produce a rotating magnetic field in the frame of reference of the stator, a rotor rotatable within the stator, and an enclosure containing the stator windings, stator, and rotor. In some embodiments, the rotor can have one or more permanent magnets embedded within it and thus the motor can be an interior permanent magnet motor. The stator can be of generally cylindrical form having first and second end faces, an inner diameter and an outer diameter, a backiron extending from the outer diameter to the base of a number of teeth, and the number of teeth extending from the backiron to the inner diameter. The teeth can be separated by a number of stator slots and the conductive stator windings can be positioned within the stator slots.

In some embodiments of the electric motor, the stator windings can be continuous windings inserted into the stator slots in a predetermined winding pattern such that each stator winding has a phase lead (input) and a neutral lead (output) extending above one of the end faces of the stator. In some embodiments, all of the phase leads can extend above the same end face of the stator. In some embodiments, all of the phase leads and all neutral leads can extend above the same end face of the stator. A continuous winding can include a number of generally straight leg portions for positioning within (for example via radial insertion) the stator slots and a number of crowns formed in the stator winding connecting successive leg portions. The crowns can include a bend or a compound bend at an apex of the crown and successive crowns of a stator winding can extend alternately above the first and second end faces of the stator. In some embodiments, the adjacent winding crowns can nest with one another to form a circular row of a compact winding arrangement above the first and second end faces of the stator. In one example three-phase motor, the winding pattern can include eighteen stator windings fed in parallel with six stator windings per each of the three phases.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Embodiments of a Three-Phase Bus Bar Arrangement

FIGS. 1A and 1B illustrate perspective views of a neutral bus bar 310A and a third phase bus bar 340 according to one embodiment. The phase bus bar 340 can be a third phase bus bar in a phase lead bus bar arrangement that also includes a first phase lead bus bar and a second phase lead bus bar. The neutral bus bar 310A can be neutral bus bar in a neutral bus bar arrangement that also includes a neutral bus bar 310B and a neutral bus bar 310C.

Each bus bar includes one or more planar branches. Referring to FIG. 1A, for example the neutral bus bar 310A can have a planar branch 317A. As illustrated, the planar branch 317A can have substantially flat upper and lower faces. The neutral bus bar 310A includes a set of three legs 312A that extend from the planar branch 317A. Other configurations are possible.

In the illustrated embodiment, each leg 312A has a neutral slot 314A. Each leg 132A has a neutral terminal end 313A. The neutral slots 314A can be located at the neutral terminal ends 313A. In the illustrated embodiment, each neutral slot 314A is defined by three surfaces at the neutral terminal end 313A. The neutral terminal ends 313A can include one or more projections that define the neutral slots 314A. The neutral slots 314A are designed for physically coupling with one or more neutral leads of one or more stator windings. Slots having other shapes and sizes in addition to the example illustrated in FIG. 1B are possible.

Referring to FIG. 1B, the third phase lead bus bar 340 can have a planar branch 347 with a first leg 342A and a second leg 342B leg extending from the planar branch 347. The legs 342A, 342B can be connected to the planar branch 347 via bridges 341A, 341B that can include a bend or compound bend, such that the legs 342A, 342B extend at an angle and/or lie within a different plane than the planar branch 347.

Each leg 342A, 342B can have a slot 344A, 344B at a phase lead terminal end 343A, 343B. In the illustrated embodiment, edges of the slot 344A, 344B are defined by three surfaces at the terminal ends 343A, 343B. The terminal ends of the phase lead bus bar can include one or more projections that define the slots 344A, 344B. The slots 344A, 344B are designed for physically coupling with the phase lead of one or more stator windings. In the illustrated example, the slots 344A, 344B each physically couple with three phase leads. Other configurations are possible. The two legs 342A, 342B can extend in different directions from one another. The slot 344A can be positioned along the inner circumference, for example above a winding layer along the inner diameter of the stator, and the slot 344B can be positioned along the outer circumference, for example above the outer layer of the stator slot adjacent to the stator backiron.

The shapes and sizes of the planar branches, bridges, and legs of the bus bars in bus bar arrangements, such as phase lead bus bar 340 and neutral bus bar 310A, can be selected for a particular configuration. For example, the bus bars can form a compact nested configuration without touching one another, as contact between the bus bars can short an electric motor. Further, the shapes of the planar branches, bridges, and legs of the bus bars can be selected so that the slots, such as slots 314A and slots 344A-B are positioned to receive respective leads according to the winding pattern of the stator.

Figure 2:
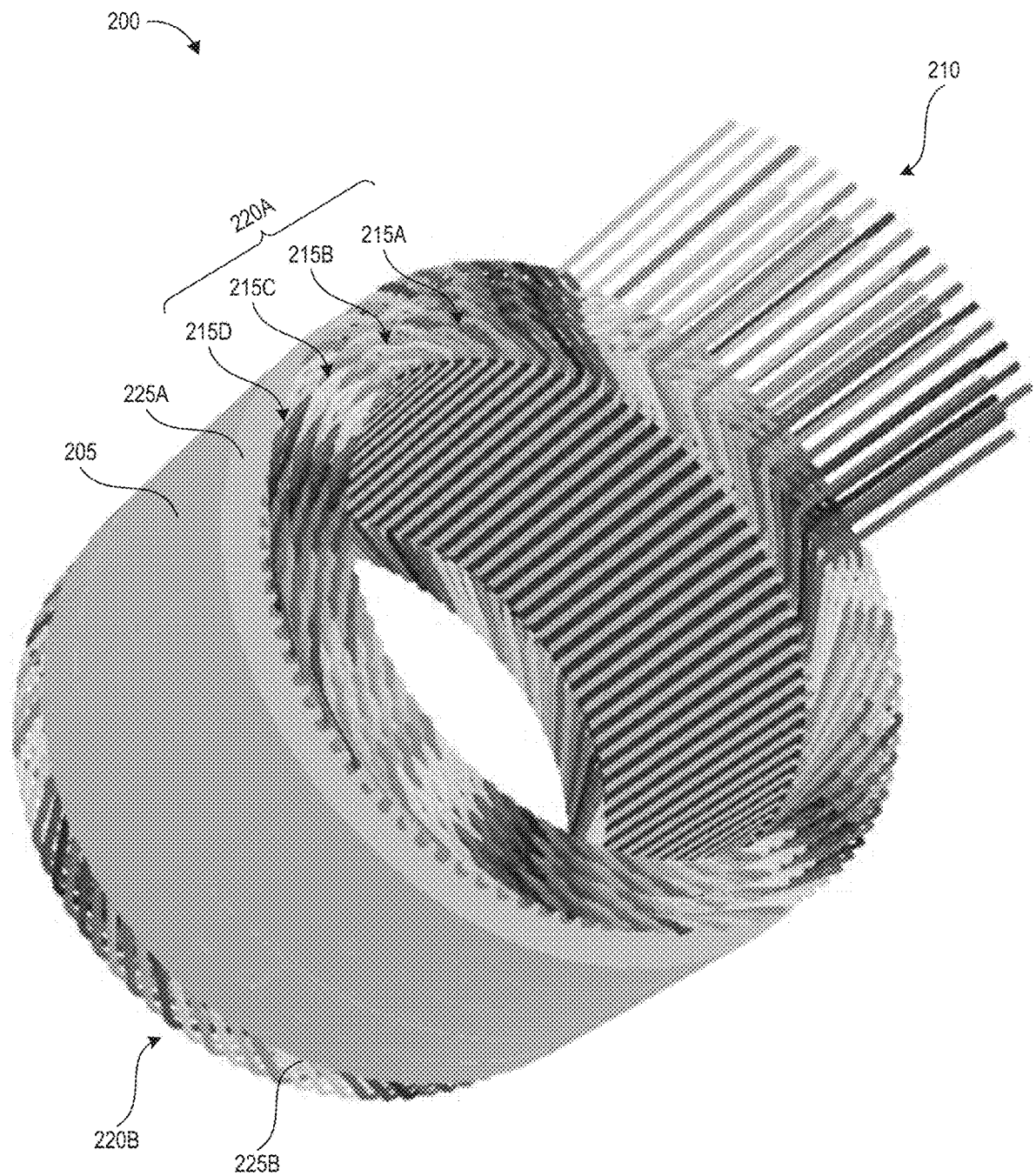
FIG. 2 illustrates a perspective view of a stator and stator windings.
Figure 3:
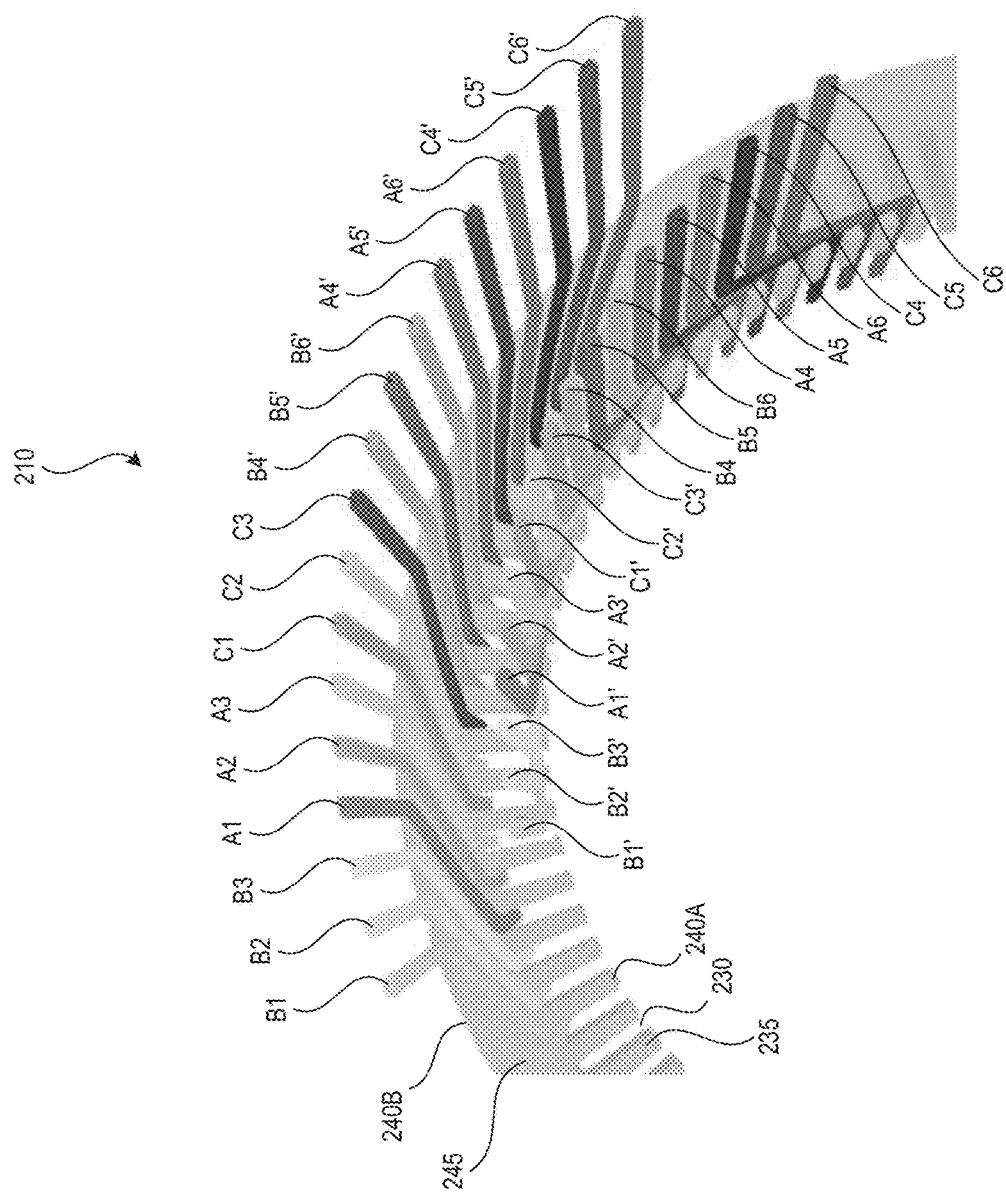
FIG. 3 illustrates, for each of the stator windings of FIG. 2, a phase lead entering the stator through a first end face and a neutral lead exiting the stator through the first end face.
Figure 4:
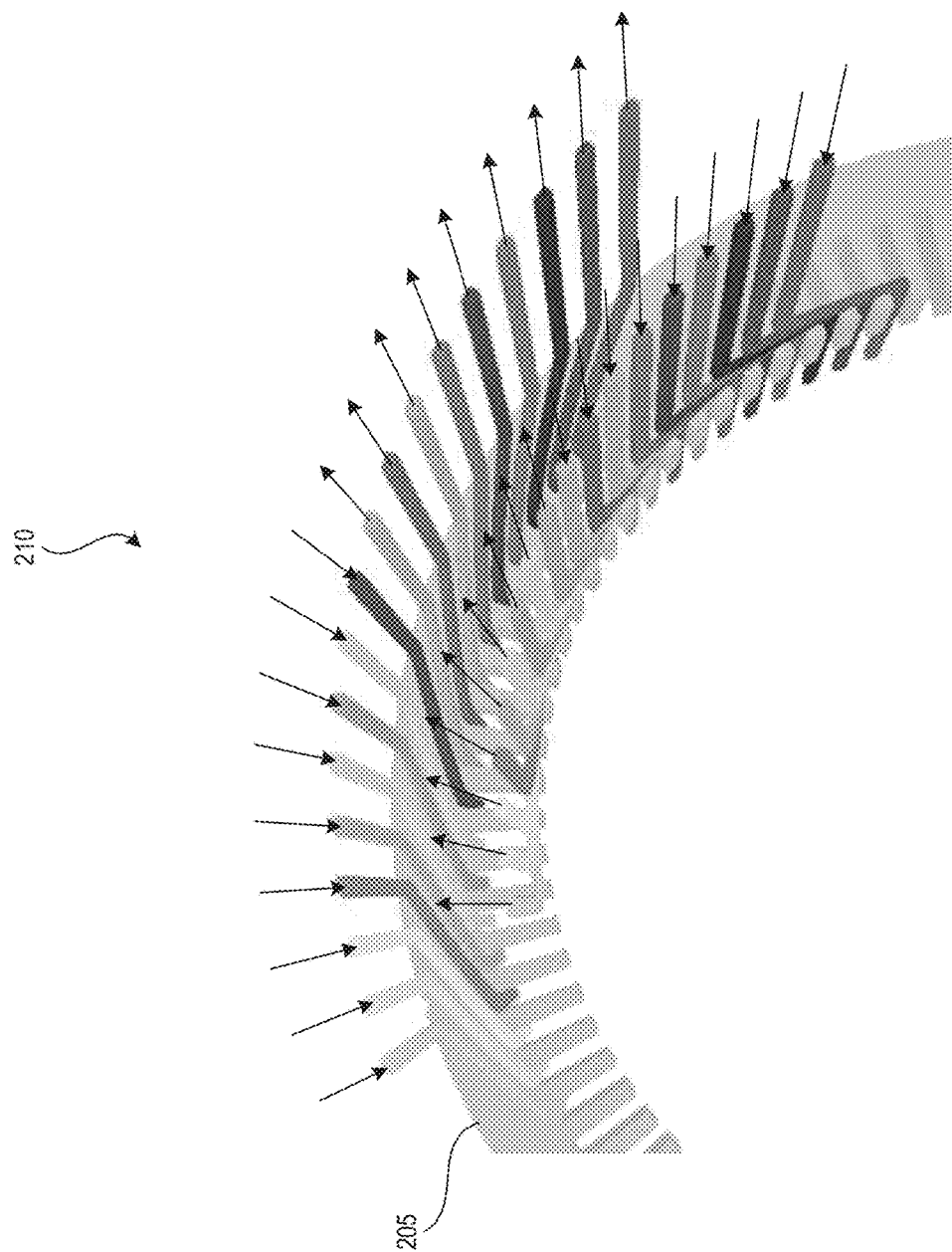
FIG. 4 illustrates a current flow direction for the phase lead and neutral lead of each of the conductors of the stator winding of FIG. 2.

FIG. 2 illustrates a perspective view of a stator assembly 200 including a stator 205 and stator windings 210. FIG. 3 illustrates, for each of the conductors of the stator winding 210 of FIG. 2, the phase lead entering the stator through a first end face 225A and the neutral lead exiting the stator through the first end face 225A. FIG. 4 illustrates a current flow direction for the phase lead and neutral lead of each of the conductors of the stator winding of FIG. 2. FIGS. 2-4 are described together below.

The stator 205 can be of generally cylindrical form having a first end face 225A and a second end face 225B, as shown in FIG. 2. Referring to FIG. 3, the stator 205 can include an inner diameter 240A and an outer diameter 240B, a backiron 245 extending from the outer diameter 240B to the base of a number of teeth 235, and teeth 235 extending from the backiron 245 to the inner diameter 240A, as shown in FIG. 3. The teeth 235 can be separated by a number of stator slots 230 and the conductive stator windings 210 can be positioned within the stator slots 230. In some embodiments of the electric motor, the stator windings 210 can be continuous windings inserted into the stator slots 230 in a predetermined winding pattern such that each stator winding has a phase lead (input) and a neutral lead (output) extending above one of the end faces 225A of the stator, as shown in FIG. 3.

Each continuous stator winding 210 can include a number of straight or generally straight leg portions for positioning within the stator slots 230. Referring back to FIG. 2, each continuous stator winding 210 can include a number of crowns 215A-215D formed in the continuous stator winding 210 and connecting successive leg portions. The crowns 215A-215D can include a bend or a compound bend at an apex of the crown 215A-215D. The successive crowns in a winding can extend alternately above the first end face 225A and the second end face 225B of the stator 205. The illustrated winding pattern includes eight layers and four circular rows of crowns, where the adjacent crowns nest with one another to form a compact winding arrangement of a first set of nested crowns 220A extending past the first end face 225A and a second set of nested crowns 220B extending past the second end face 225B of the stator 205. Other configurations are possible. In the illustrated example, the winding pattern includes eighteen stator windings fed in parallel with six stator windings per each of the three phases. Other configurations are possible. Each stator winding can include a conductor and an electrically insulating coating, which prevents contact between conductors of adjacent stator windings, as described herein.

FIG. 3 illustrates the winding pattern, showing the phase leads of the eighteen conductors entering the stator 205 and neutral leads of the eighteen conductors exiting the stator 205. FIG. 4 shows the direction of the current flowing into the conductors at the phase leads and flowing out of the conductors at the neutral leads. The phase leads of the conductors are denoted by A1-A6, B1-B6, and C1-C6, which denote the phase leads of each of the six conductors for carrying current phases A, B, and C. The neutral leads of the conductors are denoted by A1'-A6', B1'-B6', and C1'-C6'. The neutral lead and the phase lead can be on opposite ends of the stator winding 210. For purposes of illustration, the rest of each of the stator winding is not shown in FIGS. 3 and 4, however in the example winding pattern each stator winding winds around the circumference of the stator 205 four times, forming a nested configuration of four circular rows of crowns while having eight layers of stator winding in each stator slot 230. Other configurations are possible.

Figure 5:
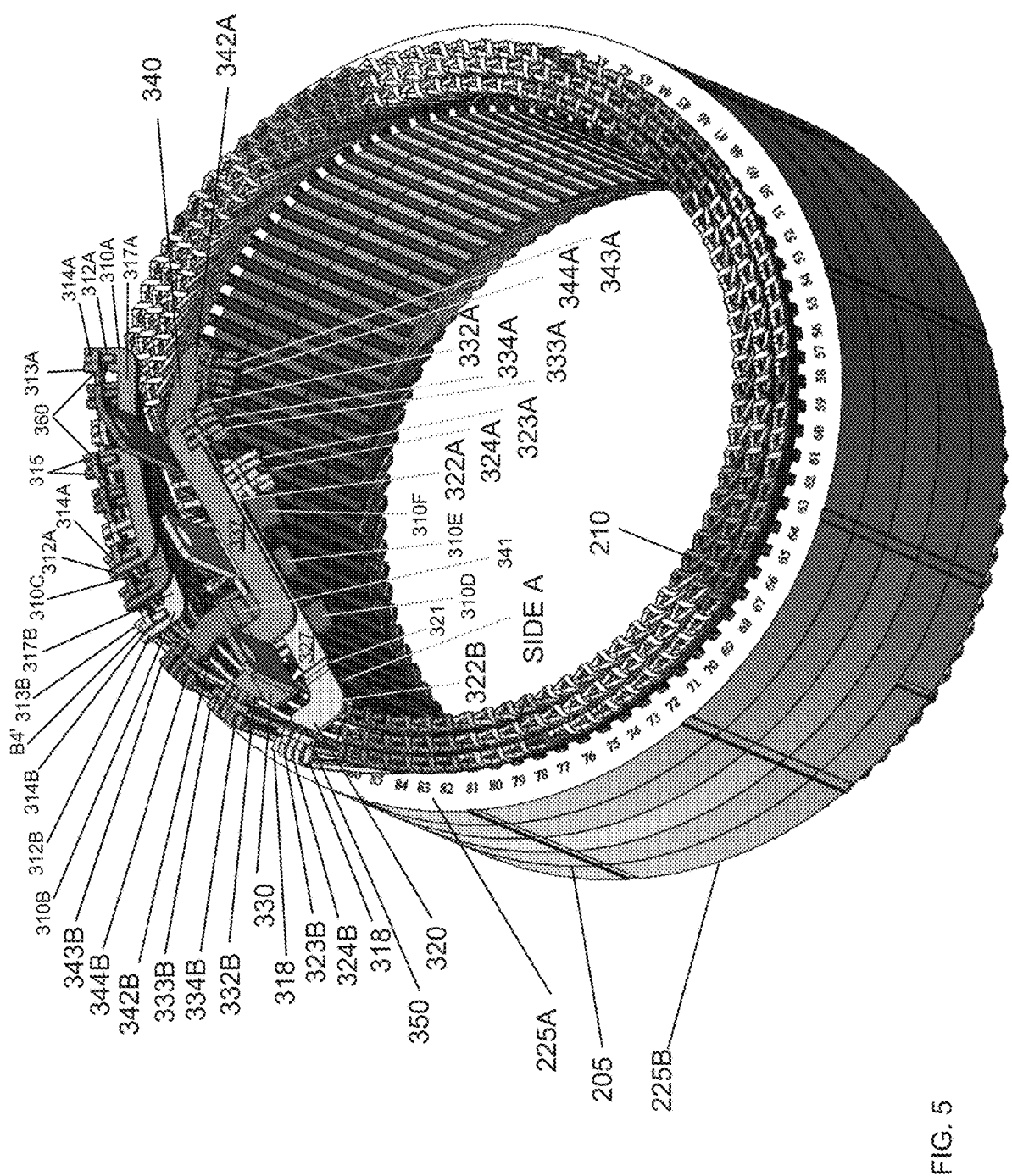
FIG. 5 illustrates a perspective view of the leads of FIG. 3 coupled to a bus bar arrangement according to one embodiment.

In the illustrated implementation, the winding pattern forms four circular rows of crowns above the stator slots 230, while filling each stator slot 230 with eight conductors. Other implementations are contemplated. The illustrated winding pattern has three adjacent stator slots 230 with B phase conductors, with the next three adjacent stator slots 230 having A phase conductors, and the next three adjacent stator slots 230 having C phase conductors. This pattern can repeat all the way around the circumference of the stator 205. Other configurations, such as that described below with reference to FIG. 5, are possible. Thus, in some embodiments, the stator design or winding pattern can have different numbers of circular rows of crowns, a different number of conductor pairs in each stator slot, and/or a different pattern of phase positioning around the stator circumference.

FIG. 5 illustrates a perspective view of the leads of FIG. 3B coupled to a bus bar arrangement 300 according to one embodiment. FIG. 5 illustrates an example implementation in which leads of FIG. 3 are coupled to the bus bar arrangement 300 according to laser welding systems and methods described herein. The implementation illustrated in FIG. 5 includes stator windings 210 similar to those described above with reference to FIGS. 2-4. The stator windings 210 can include the phase leads of the conductors A1-A6, B1-B6, C1-C6. The stator windings 210 can include the neutral leads of the conductors A1'-A6', B1'-B6', C1'-C6'. The system illustrated in FIG. 5 also includes stator 205 similar to the stator described above with reference to FIG. 2.

The three-phase bus bar arrangement 300 can provide three phases of electric current to the stator leads connected thereto. The three-phase bus bar arrangement 300 can include a first phase lead bus bar 320, a second phase lead bus bar 330, and a third phase lead bus bar 340. The first phase lead bus bar 320 can be connected to the B phase leads. As will be described in detail below, the first phase lead bus bar 320 can include a slot 324A that couples to the phase leads of conductors B4-B6, and a slot 324B that couples to the phase leads of conductors B1-B3. The second phase lead bus bar 330 can be connected to the A phase leads. As will be described in detail below, the second phase lead bus bar 330 can include a slot 334A that couples to the phase leads of conductors A4-A6, and a slot 334B that couples to the phase leads of conductors A1-A3. The third phase lead bus bar 340 can be connected to the C phase leads. As will be described in detail below, the third phase lead bus bar 340 can include a slot 344A that couples to the phase leads of conductors C4-C6, and a slot 344B of that couples to the phase leads of conductors C1-C3.

The bus bar arrangement 300 can include neutral bus bars 310A, 310B, 310C, 310D, 310E, 310F. The neutral bus bars 310A-310F can connect to the neutral leads of the stator windings. For example, the neutral bus bars 310A-310F can be coupled to the neutral leads of the conductors A1'-A6', B1'-B6', C1'-C6'. The neutral bus bars 310A-310F can be electrically isolated from each other. It will be understood that systems and methods to laser weld stator leads to bus bars described herein are applicable to stator windings and bus bar arrangements generally and are not limited to the implementation illustrated in FIGS. 5-10.

The bus bar arrangement 300, or portions thereof, can comprise a conductive material. The first phase lead bus bar 320, the second phase lead bus bar 330, the third phase lead bus bar 340, and/or the neutral bus bars 310A-310F, or portions thereof, can comprise any suitable conductive material, which can be a metal such as aluminum, brass, copper, tin, or an alloy thereof. For example, the conductor can be made of a copper alloy. Alloys can be heat treated to produce a structurally robust conductive material having high yield strength.

Each stator winding can include a conductor and an electrically insulating coating. The conductors of the stator windings can be metallic. The conductor or portions thereof can comprise any suitable conductive material, which can be a metal such as aluminum, brass, copper, tin, or an alloy thereof. For example, the conductor can be made of a copper alloy. Alloys can be heat treated to produce a structurally robust conductive material having high yield strength. The stator windings can have a shaped cross-section and an external surface. In some embodiments, a cross section of the conductor of the stator windings, or the stator winding itself, has a polygonal shape such as but not limited to a triangular, rectangular, or square cross-sectional shape. In some embodiments, a cross section of the conductor of the stator windings, or the stator winding itself, has a rounded shape such as a circular, oval, or elliptical cross-sectional shape. Other cross-sectional shapes are contemplated.

The stator windings can include an electrically insulating coating. In some embodiments, the electrically insulating coating can comprise polyimides, PET, PEEK, or Kapton®. Kapton is a polyimide film with a chemical name of polyoxydiphenylene-pyromellitimide. The electrically insulating coating can be applied in a liquid, gaseous, or solid state. The electrically insulating coating is configured to prevent conductor to conductor contact of adjacent stator windings. In some cases, the electrically insulating coating is configured to prevent conductor contact with any other conductive surface of the electric motor. For example, the electrically insulating coating can be configured to prevent conductor to stator contact.

Each stator winding can have one or more leads. The stator winding can include a phase lead and a neutral lead. The electrically insulating coating may not extend to the lead, such that a portion of the stator winding near the lead is exposed to form an electrical connection with the corresponding bus bar.

The bus bar arrangement 300 can supply current from a power source to the conductive stator windings. The bus arrangement 300 can distribute the current to a number of stator windings. In the illustrated examples, each phase lead bus bar of the three-phase bus bar arrangement 300 can distribute current to six stator windings. In the illustrated examples, the three-phase bus bar arrangement 300 can distribute current to eighteen stator windings.

Referring to FIG. 5, the bus bar arrangement 300 can include neutral bus bars 310A-310F. Nine neutral leads of the conductors A1'-A6', B1'-B6', C1'-C6' can be connected to the neutral bus bars 310D, 310E, and 310F using methods and systems for laser welding described herein (although not illustrated in FIG. 5). For example, three neutral leads can be connected to neutral bus bar 310D, three neutral leads can be connected to neutral bus bar 310E, and three neutral leads can be connected to neutral bus bar 310F. In some cases, a group of three neutral leads is laser welded to a bottom surface of one of the neutral bus bars 310D, 310E, 310F according to systems and method described herein. In one non-limiting example, top surfaces of each of three neutral leads lie in direct physical contact with a bottom surface of one of the neutral bus bars 310D, 310E, 310F. The top surfaces of each of the three neutral leads can include a surface modification and be laser welded to the bottom surface of one of the neutral bus bars 310D, 310E, 310F.

The neutral bus bars 310A, 310B, and 310C can each include a planar branch 317A, 317B, 317C, respectively. Each planar branch can have three legs 312. The planar branch 317A has three legs 312A. The planar branch 317B has three legs 312B. The planar branch 317C has three legs 312C. Each planar branch 317A, 317B, 317C can have substantially flat upper and lower surfaces. In the illustrated embodiment, each leg 312A-312C can have one neutral slot 314A-314C. Each leg 312A-312C can have a neutral terminal end 313A-313C. Each leg 312A, 312B, 312C can have one or more neutral slots 314A-314C. The neutral slots 314A-314C can position the neutral lead relative to the neutral bus bar 310A, 310B, 310C. In some embodiments, the neutral bus bars 310A, 310B, 310C can include neutral slots sized to accept one or more neutral leads as described herein.

The neutral slots 314A-314C can be located at the neutral terminal ends 313A-313C. The neutral slots 314A-314C can be located at the neutral terminal ends 313A-313C. In the illustrated embodiment, the neutral slots 314A-314C are defined by three surfaces and are not enclosed. The neutral slots 314A-314C can form a C-shaped configuration. Each terminal end 313A-313C can include two projections 315 that define the neutral slots 314A-314C. The projections 315 can be straight or substantially straight. The projections 315 can define a boundary of each neutral slot 314A-314C. The bend of the stator winding can be placed between the pair of projections 315 of a leg 312A-312C. In some embodiments, the neutral lead lies against the leg 312A-312C when the stator winding is placed between the pair of projections 315.

Each neutral slot 314A-314C of the neutral bus bars 310A, 310B, 310C can be designed to couple to one neutral lead of a stator winding. In some embodiments, the projections 315 are spaced apart a distance equal or approximately equal to the diameter or cross-sectional dimension of a stator winding. In other embodiments, each neutral slot 314A-314C can be designed to hold more than one stator winding (e.g., two stator windings, three stator windings, four stator windings, five stator windings, six stator windings, etc.).

As illustrated, the three neutral terminal ends 313A can extend in the same direction from the planar branch 317A. As illustrated, the three neutral terminal ends 313B can extend in the same direction from the planar branch 317B. As illustrated, the three neutral terminal ends 313C can extend in the same direction from the planar branch 317C. The nine neutral terminal ends 313A, 313B, 313C of the three planar branches 317A, 317B, 317C can extend toward the backiron or the outer circumference of the stator 205. The planar branches 317A, 317B, 317C can be stacked, with one leg adjacent to another leg. The planar branches 317A, 317B, 317C can overlap from a top-down perspective orthogonal to the plane of the branches but are spaced apart from a side perspective orthogonal to the top down-perspective. In some embodiments, the legs 312A-312C can be spaced apart circumferentially around the stator 205. In some embodiments, the legs 312A-312C can be spaced apart along the height of the stator 205. The first set of legs 312A-312C can be positioned such that the neutral slots 314A-314C of the first set of legs 312A-312C are positioned along an outer circumference.

The bus bar arrangement 300 can include a three-phase bus bar arrangement. The three-phase bus bar arrangement 300 can include the first phase lead bus bar 320, the second phase lead bus bar 330, and the third phase lead bus bar 340. The phase lead bus bars 320, 330, 340 can have the same or similar configuration. The phase lead bus bars 320, 330, 340 can each have a different or unique configuration based on the configuration and the geometry of the stator 205. FIG. 5 shows one example of the arrangement of the three-phase bus bar arrangement 300. In some embodiments, the first phase lead bus bar 320, the second phase lead bus bar 330, and the third phase lead bus bar 340 can include slots sized to accept phase leads as described herein.

The first phase lead bus bar 320 can include any configuration which allows the first phase lead bus bar 320 to connect to one or more phase leads in a single phase. The first phase lead bus bar 320 can have a planar branch 327 with a first leg 322A and a second leg 322B extending from the planar branch 327. The legs 322A, 322B can be connected to the planar branch 327 via one or more bridges 321 that can include a bend or compound bend, such that the legs 322A, 322B extend at an angle and/or lie within a different plane than the planar branch 327. The legs 322A, 322B can be connected to the opposite sides of the planar branch 327 as shown in FIG. 5.

Each leg 322A, 322B can have a slot 324A, 324B at a phase lead terminal end 323A, 323B. In the illustrated embodiment, the slots 324A, 324B are defined by three surfaces and are not enclosed. The slots 324A, 324B can form a C-shaped configuration. Each phase lead terminal end 323A, 323B can include two projections 318 that define the slots 324A, 324B. The projections 318 can be straight or substantially straight. The projections can 318 define a boundary of each slot 324A, 324B. The two projections 318 can be parallel or generally parallel. The bend of the stator winding can be placed between the pair of projections 318 of the leg 322A. In some embodiments, the phase lead lies against the leg 322A when the stator winding is placed between the pair of projections 318 of the leg 322A.

Each slot 324A, 324B can be designed to couple to three phase leads of the stator windings. In some embodiments, the projections 318 are spaced apart a distance equal or approximately equal to the diameter or cross-sectional dimension of three stator windings. In some embodiments, each slot 324A, 324B can be designed to hold one or more stator windings (e.g., one stator winding, two stator windings, three stator windings, four stator windings, five stator windings, six stator windings, etc.).

The slots 324A, 324B are positioned for coupling with the one or more stator windings. The slot 324A can extend along the inner circumference, for example above a winding layer along the inner diameter of the stator, and the slot 324B can be positioned along the outer circumference, for example above the outer layer of the stator slot adjacent to the stator backiron.

The second phase lead bus bar 330 can include any configuration which allows the second phase lead bus bar 330 to connect to one or more phase leads in a single phase. The second phase lead bus bar 330 can have a planar branch 337 with a first leg 332A and a second leg 332B extending from the planar branch 337. The legs 332A, 332B can be connected to the planar branch 337 via one or more bridges 331 (not shown) that can include a bend or compound bend, such that the legs 332A, 332B extend at an angle and/or lie within a different plane than the planar branch 337. The legs 332A, 332B can be connected to the opposite sides of the planar branch 337 as shown in FIG. 5.

Each leg 332A, 332B can have a slot 334A, 334B at a phase lead terminal end 333A, 333B. In the illustrated embodiment, the slots 334A, 334B are defined by three surfaces and are not enclosed. The slots 334A, 334B can form a C-shaped configuration. Each phase lead terminal end 333A, 333B can include two projections 318 that define the slots 334A, 334B. The projections 318 can be straight or substantially straight. The projections 318 can define a boundary of each slot 334A, 334B. The two projections 318 can be parallel or generally parallel. The bend of the stator winding can be placed between the pair of projections 318 of the leg 332A. In some embodiments, the phase lead lies against the leg 332A when the stator winding is placed between the pair of projections 318 of the leg 332A.

Each slot 334A, 334B can be designed to hold three stator windings. In some embodiments, the projections 318 are spaced apart the distance equal or approximately equal to the diameter of three stator windings. In some embodiments, each slot 334A, 334B can be designed to hold one or more stator winding (e.g., one stator winding, two stator windings, three stator windings, four stator windings, five stator windings, six stator windings, etc.).

The slot 334A, 334B are positioned for coupling with the one or more stator windings. The slot 334A can extend along the inner circumference, for example above a winding layer along the inner diameter of the stator, and the slot 334B can be positioned along the outer circumference, for example above the outer layer of the stator slot adjacent to the stator backiron.

The third phase lead bus bar 340 can include any configuration which allows the third phase lead bus bar 340 to connect to phase leads in a single phase. The third phase lead bus bar 340 can have a planar branch 347 with a first leg 342A and a second leg 342B extending from the planar branch 347. The legs 342A, 342B can be connected to the planar branch 347 via one or more bridges 341 that can include a bend or compound bend, such that the legs 342A, 342B extends at an angle and/or lie within a different plane than the planar branch 347. The legs 342A, 342B can be connected to the opposite sides of the planar branch 347 as shown in FIG. 5.

Each leg 342A, 342B can have a slot 344A, 344B at a phase lead terminal end 343A, 343B. In the illustrated embodiment, the slots 344A, 344B are defined by three surfaces and are not enclosed. The slots 344A, 344B can form a C-shaped configuration. Each phase lead terminal end 343A, 343B can include two projections 318 that define the slots 344A, 344B. The projections 318 can be straight or substantially straight. Tof the he projections 318 define a boundary of each slot 344A, 344B. The two projections 318 can be parallel or generally parallel. The bend of the stator winding can be placed between the pair of projections 318 of the leg 342A. In some embodiments, the phase lead lies against the leg 342A when the stator winding is placed between the pair of projections 318 of the leg 342A.

Each slot 344A, 344B can be designed to couple to three phase leads of the stator windings. In some embodiments, the projections 318 are spaced apart the distance equal or approximately equal to the diameter or cross-sectional dimension of three stator windings. In some embodiments, each slot 344A, 344B can be designed to hold one or more stator winding (e.g., one stator winding, two stator windings, three stator windings, four stator windings, five stator windings, six stator windings, etc.).

The slots 344A, 344B are positioned for coupling with the one or more stator windings. The slot 344A can extend along the inner circumference, for example above a winding layer along the inner diameter of the stator, and the slot 344B can be positioned along the outer circumference, for example above the outer layer of the stator slot adjacent to the stator backiron.

The shapes of the planar branches, bridges, and legs of the phase lead bus bars 320, 330, 340 and neutral bus bars 310A-F can be selected so that the bus bars form a compact configuration without touching one another, as contact between the bus bars can short an electric motor. Further, the shapes of the planar branches, bridges, and legs of the phase lead bus bars 320, 330, 340 can be selected so that the slots 324A-B, 334A-B, 344A-B are positioned to receive respective phase leads according to the winding pattern of the stator 205. The perspective view of FIG. 5 illustrate how the planar branches 327, 337, 347 of the first, second, and third phase lead bus bars 320, 330, 340 overlap from a top-down perspective orthogonal to the plane of the branches but are spaced apart from a side perspective orthogonal to the top down-perspective. Further, the shapes of the planar branches, bridges, and legs of the neutral bus bars 310A-310F can be selected so that slots 314A-314F are positioned to receive respective neutral leads (in the case of neutral bus bars 310A-310C) and so that surfaces are positioned to be in direct physical contact with respective neutral leads (in the case of neutral bus bars 310D-310F) according to the configuration and winding pattern of the stator 205.

The first phase lead bus bar 320, the second phase lead bus bar 330, and the third phase lead bus bar 340 each connect to a single phase of the conductors A1-A6, B1-B6, and C1-C6. The first phase lead bus bar 320 can be connected to the B phase leads. The second phase lead bus bar 330 can be connected to the A phase leads. The third phase lead bus bar 340 can be connected to the C phase leads.

Figure 6:
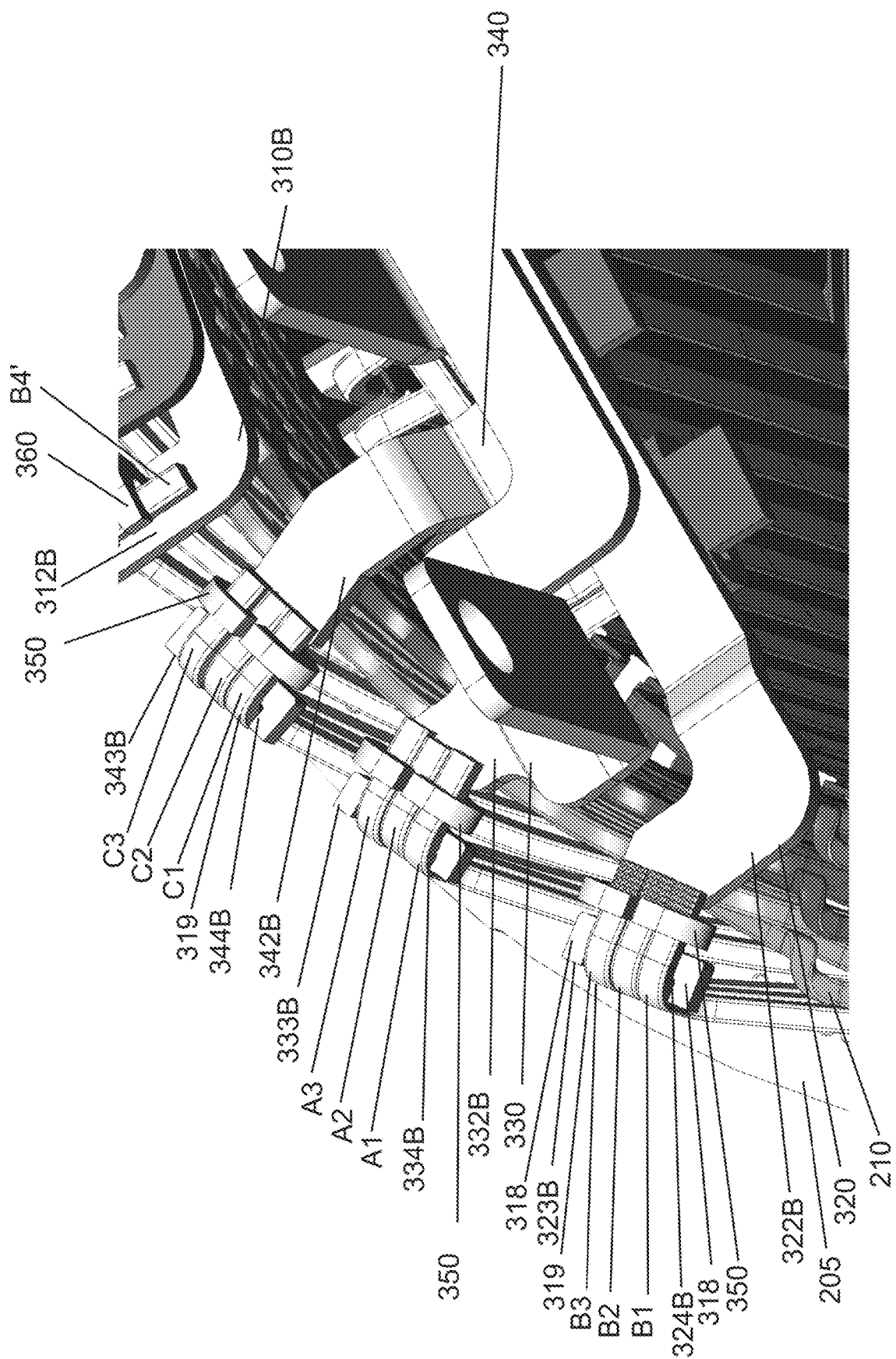
FIG. 6 illustrates a perspective view of a subset of the leads coupled with legs of the bus bar arrangement of FIG. 5.

FIG. 6 illustrates an enlarged view of FIG. 5, showing a portion of the phase lead bus bars 320, 330, 340 and the associated leads. The second legs 322B, 332B, 342B of the phase lead bus bars 320, 330, 340 extend toward the outer circumference. While features of the second legs 322B, 332B, 342B will now be described with reference to FIG. 6, it will be understood that the first legs 322A, 332A, 342A can also include any of the following features. FIG. 6 also illustrates a portion of leg 312B of the neutral bus bar 310B. The legs of the neutral bus bars 310A, 310B, 310C can also include features described below with reference to 322B, 332B, 342B.

Each leg 322B, 332B, 342B can include the slot 324B, 334B, 344B at a phase lead terminal end 323B, 333B, 343B. Each slot 324B, 334B, 344B is designed for coupling the phase lead of one or more stator windings to a portion of the corresponding bus bar, such as a leg of the bus bar. In the illustrated embodiment, each slot 324B, 334B, 344B is shaped and sized to accommodate three phase leads of three stator windings. In the illustrated embodiment, the slot 324B is shaped and sized to accommodate conductors B1-B3. In the illustrated embodiment, the slot 334B is shaped and sized to accommodate conductors A1-A3. In the illustrated embodiment, the slot 344B is shaped and sized to accommodate conductors C1-C3. Each slot 324B, 334B, 344B is defined by a pair of projections 318 as described herein.

The stator windings can include a bend to facilitate the joining of the stator windings and the bus bar arrangement 300. The stator winding can extend from the stator 205 in a direction generally orthogonal to the end face 225A of the stator 205. The stator winding can include a bend 319 to extend in a plane that is generally parallel to the end face 225A of the stator 205. The stator winding can include the bend 319 to extend radially inward from the backiron of the stator. The stator winding can include a bend 319 to extend radially outward toward the backiron of the stator (see, as just one example, stator wires associated with slots 324B, 334B, 344B illustrated in FIG. 5). The stator winding can include the bend 319 such that the phase lead can lie flat or generally flat on a portion of the corresponding phase lead bus bar. The stator winding can include the bend 319 such that the neutral lead can lie flat or generally flat on a portion of the corresponding neutral bus bar. The stator windings can include a plurality of bends.

In some embodiments, the bend 319 can be formed by shaping the stator winding into an L-shape. As used herein, an "L-shape" can refer to two straight segments joined by an angled or bent portion. The two straight segments can be perpendicular or generally perpendicular. The "L-shape" can refer to a shape comprising a first straight segment along a first axis, a second straight segment along a second axis, wherein one or more bends connects the first segment and the second segment. The bends can include a sharp bend or a contoured bend. The first axis and the second axis can be perpendicular or generally perpendicular. The two straight segments can form an angle therebetween approximately 30 degrees, 45 degrees, 60 degrees, 75 degrees, 90 degrees, 105 degrees, 120 degrees, 135 degrees, 150 degrees, etc. One of the straight segments can extend in a direction generally orthogonal to the end face 225A of the stator 205. In other cases, one of the straight segments forming the L-shaped bend extends past the first end face 225A of the stator 205 in a direction that is not generally orthogonal to the end face 225A. The stator windings can have one or more additional bends formed between the straight segments of the L-shaped bend. One of the straight segments of the L-shape bend can include a lead.

The phase lead bus bar 320, 330, 340 can include one or more clips 350 to facilitate the joining of the stator windings and the phase lead bus bar 320, 330, 340. The clip 350 can apply a compressive force on one or more stator windings. The clip 350 can be integrally formed with the leg of the corresponding bus bar. The clip 350 can at least partially encircle the portion of the stator windings that are in contact with the corresponding phase lead bus bar 320, 330, 340. The clip 350 can at least partially enclose the portion of the stator windings that are in contact with the corresponding phase lead bus bar 320, 330, 340. The clip 350 can hold the stator windings within the corresponding slot. The clip 350 can maintain the position of the phase lead relative to the phase lead bus bar 320, 330, 340. The clip 350 can ensure that the phase lead lies flat or generally flat on a portion of the corresponding phase lead bus bar 320, 330, 340.

In the illustrated embodiment, a clip 350 is integrally formed with each leg 322A, 322B, 332A, 332B, 342A, 342B. In other embodiments, the clips 350 are not integrally formed with and are physically separate from the corresponding bus bar. In the illustrated embodiment, each slot 324A, 324B, 334A, 334B, 344A, 344B can include a corresponding clip 350. In the illustrated embodiment, each group of three phase leads of conductors A1-A3, A4-A6, B1-B3, B4-B6, C1-C3, C4-C6 can include a corresponding clip 350. In the illustrated embodiment, each phase lead bus bar 320, 330, 340 can include two corresponding clips 350. Other configurations are contemplated.

In the illustrated embodiment, each clip 350 can have one or more bends. In some embodiments, the bend of the clip 350 is formed by shaping the clip into a c-shape. As used herein, a "c-shape" can refer to three straight segments joined by two angled or bent portions. As used herein, a "c-shape" can refer to a shape comprising a first straight segment along a first axis, a second straight segment along a second axis, and a third straight segment along the first axis, wherein one or more bends connects the first and second segment and one or more bends connects the second and third segment. The bends can include a sharp bend or a contoured bend. The first axis and the second axis can be parallel or generally parallel. In embodiments, the terminal ends of the clip 350 contact each other, such that the clip 350 forms a closed circle instead of a c-shape. The clips 350 can encircle a group of three stator windings. The clip 350 can position a group of three phase leads, such as the phase leads of conductors A1-A3. The clip 350 can connect a group of three stator windings to the corresponding phase lead bus bar. The clip 350 can position the group of three phase leads of conductors A1-A3 to the corresponding second phase lead bus bar 330. The clips 350 can encircle a portion of the phase lead bus bar such as a leg of the phase lead bus bar. For instance, the clip 350 can encircle a portion of the second phase lead bus bar 330 such as a leg 332B.

The neutral bus bars 310A-310F can include one or more clips 360 to facilitate the joining of the stator windings and the neutral bus bars. The clip 360 can apply a compressive force on one or more stator windings. The clip 360 can be integrally formed with the leg of the corresponding bus bar. The clip 360 can at least partially encircle the portion of one or more stator windings that is in contact with the corresponding neutral bus bar 310A-310F. The clip 360 can at least partially enclose the portion of the one or more stator windings that is in contact with the corresponding neutral bus bar 310A-310F. The clip 360 can hold the stator windings within the corresponding slot. The clip 360 can maintain the position of the neutral lead relative to the neutral bus bar 310A-310F. The clip 360 can ensure that the neutral lead lies flat or generally flat on a portion of the neutral bus bar 310A-310F. In some cases, the portion is a top surface of the neutral bus bar, such as a top surface of neutral bus bar 310A, 310B, 310C. In some case, the portion is a bottom surface of the neutral bus bar, such as a bottom surface of neutral bus bar 310D, 310E, 310F (not visible).

In the illustrated embodiment of neutral bus bars 310A, 310B, 310C, a clip 360 is integrally formed with each leg 312A-312C. In other embodiments, the clips 360 are not integrally formed with and are physically separate from the corresponding bus bar. In the illustrated embodiment, each planar branch 317A, 317B, 317C can include three corresponding clips 360. In the illustrated embodiment, each neutral slot 314A-314C can include a corresponding clip 360. Each neutral lead of the conductors A1'-A6', B1'-B6', C1'-C6' can include a corresponding clip 360. Other configurations are contemplated.

In the illustrated embodiment, each clip 360 can include one or more bends. The clips 360 can include a plurality of bends. In some embodiments, the bend of the clip 360 is formed by shaping the clip 360 into a c-shape. In some embodiments, the bend of the clip 360 is formed by shaping the clip 360 into a U-shape. As used herein, a "U-shape" can refer to three straight segments joined by two angled or bent portions. As used herein, a "U-shape" can refer to a shape comprising a first straight segment along a first axis, a second straight segment along a second axis, and a third straight segment along the third axis, wherein one or more bends connects the first and second segment and one or more bends connects the second and third segment. The bends can include a sharp bend or a contoured bend. The first axis and the second axis can be perpendicular or generally perpendicular. The second axis and the third axis can be perpendicular or generally perpendicular. The first axis and the third axis can be parallel or generally parallel.

The clip 360 can connect a stator winding to the neutral bus bar. The clips 360 can position a single neutral lead, such as neutral lead B4'. For instance, the clip 360 can position a neutral lead B4' for connection to the neutral bus bar 310B. The clips 360 can encircle a portion of the neutral bus bar such as a leg of the neutral bus bar. For instance, the clip 360 can encircle a portion of the neutral bus bar 310B such as a leg 312B.

Figure 7:
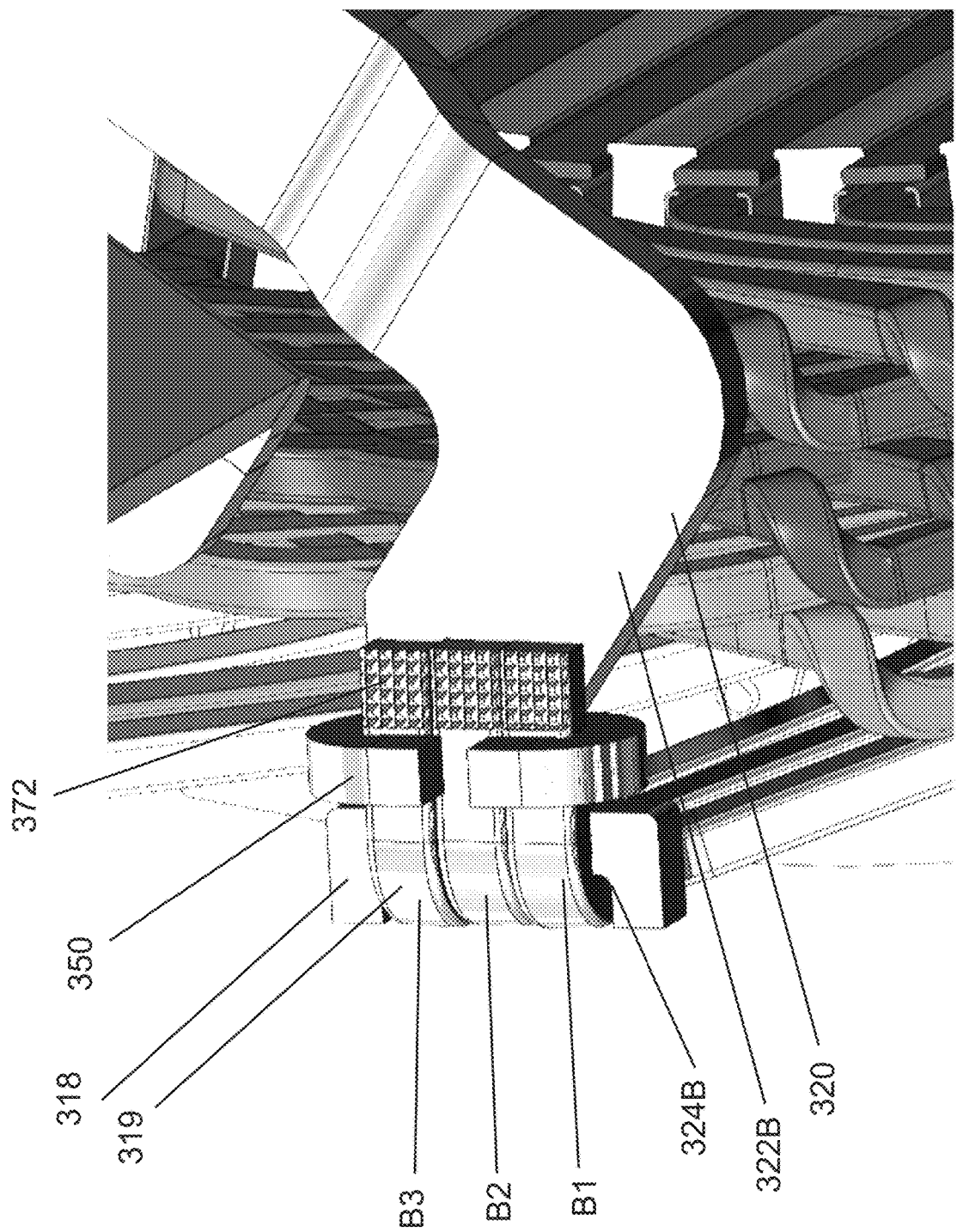
FIGS. 7-10 illustrate various perspective views of a subset of the leads coupled with a leg the bus bar arrangement of FIG. 5.
Figure 8:
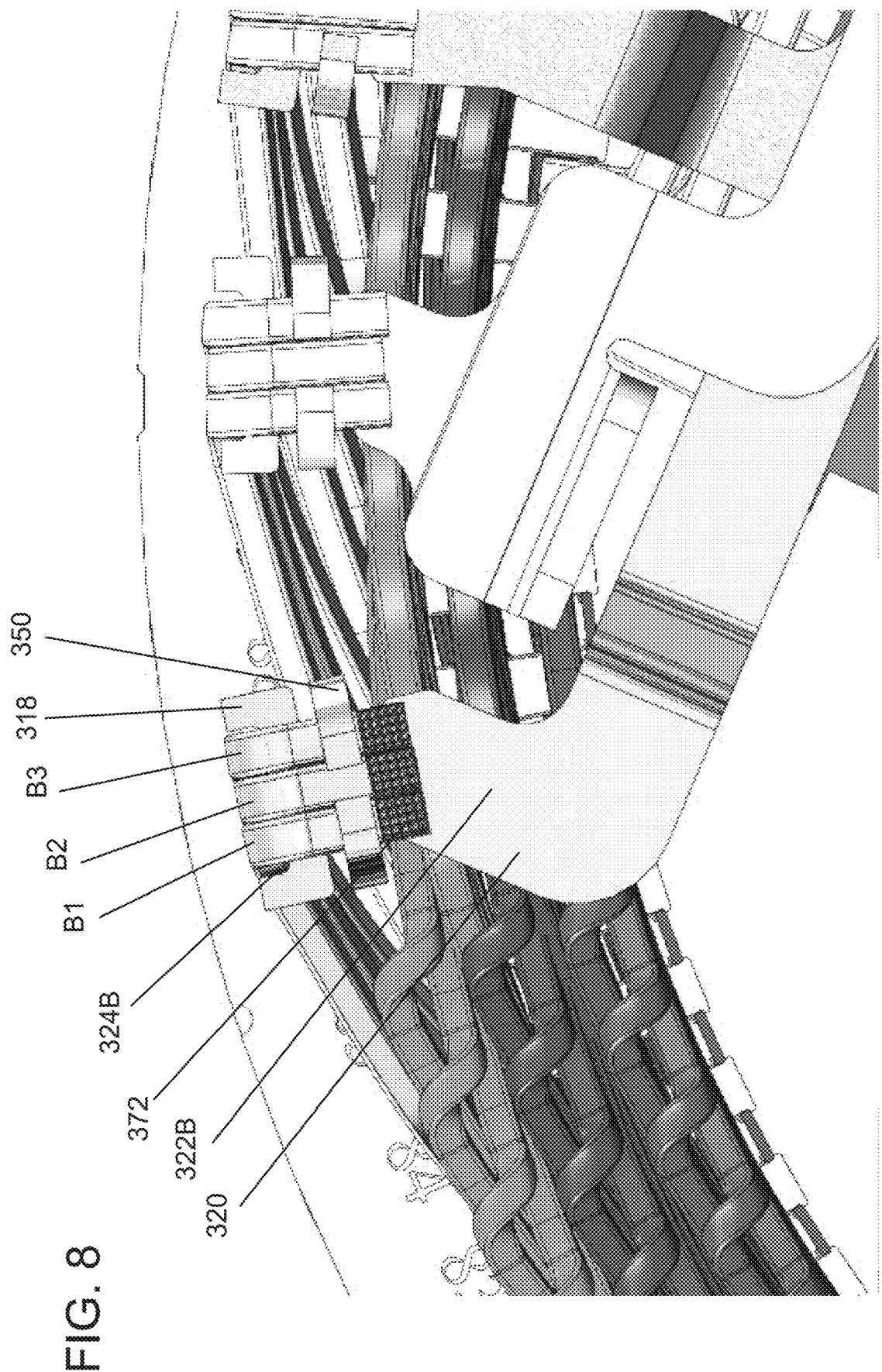
Figure 9:
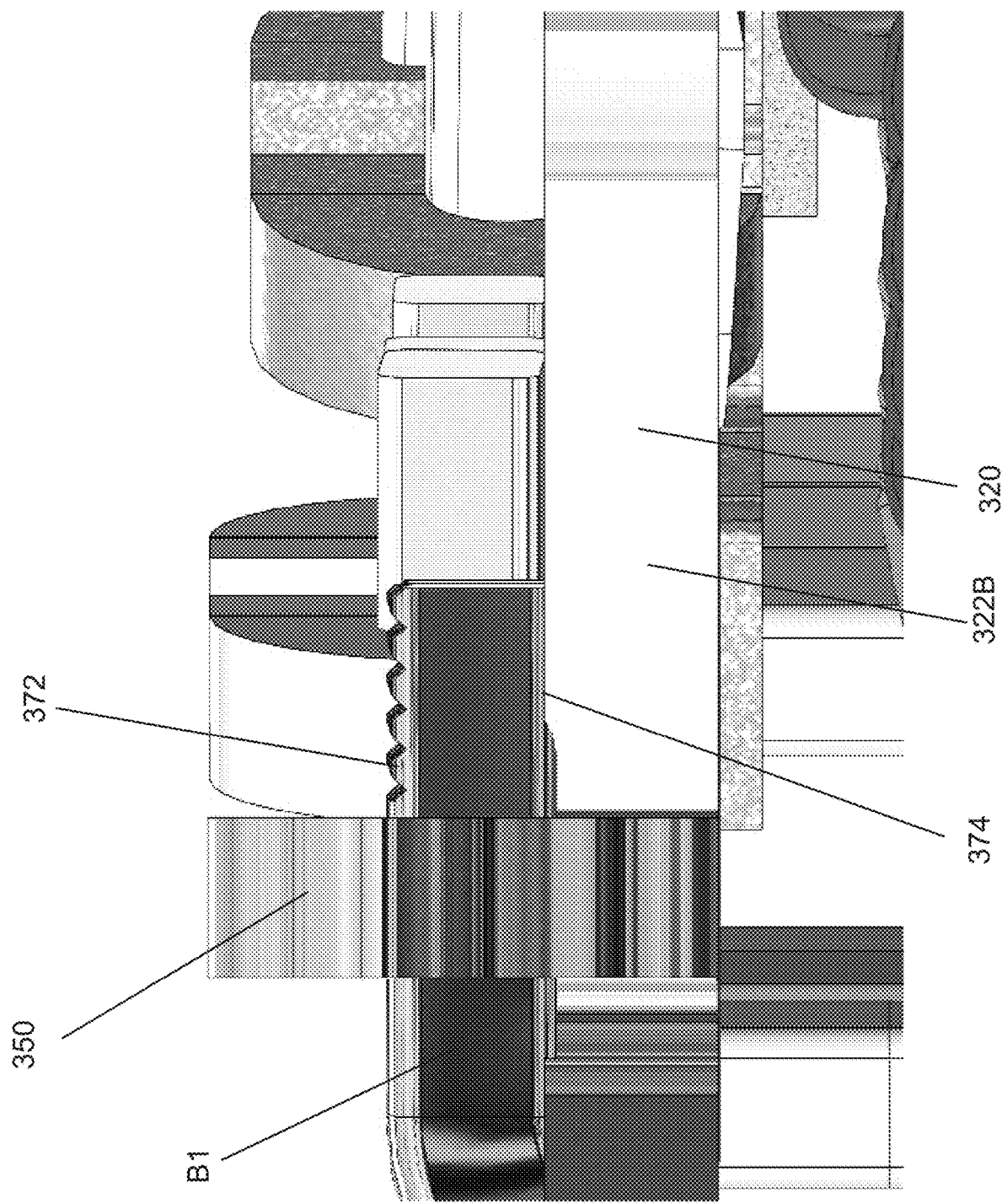
Figure 10:
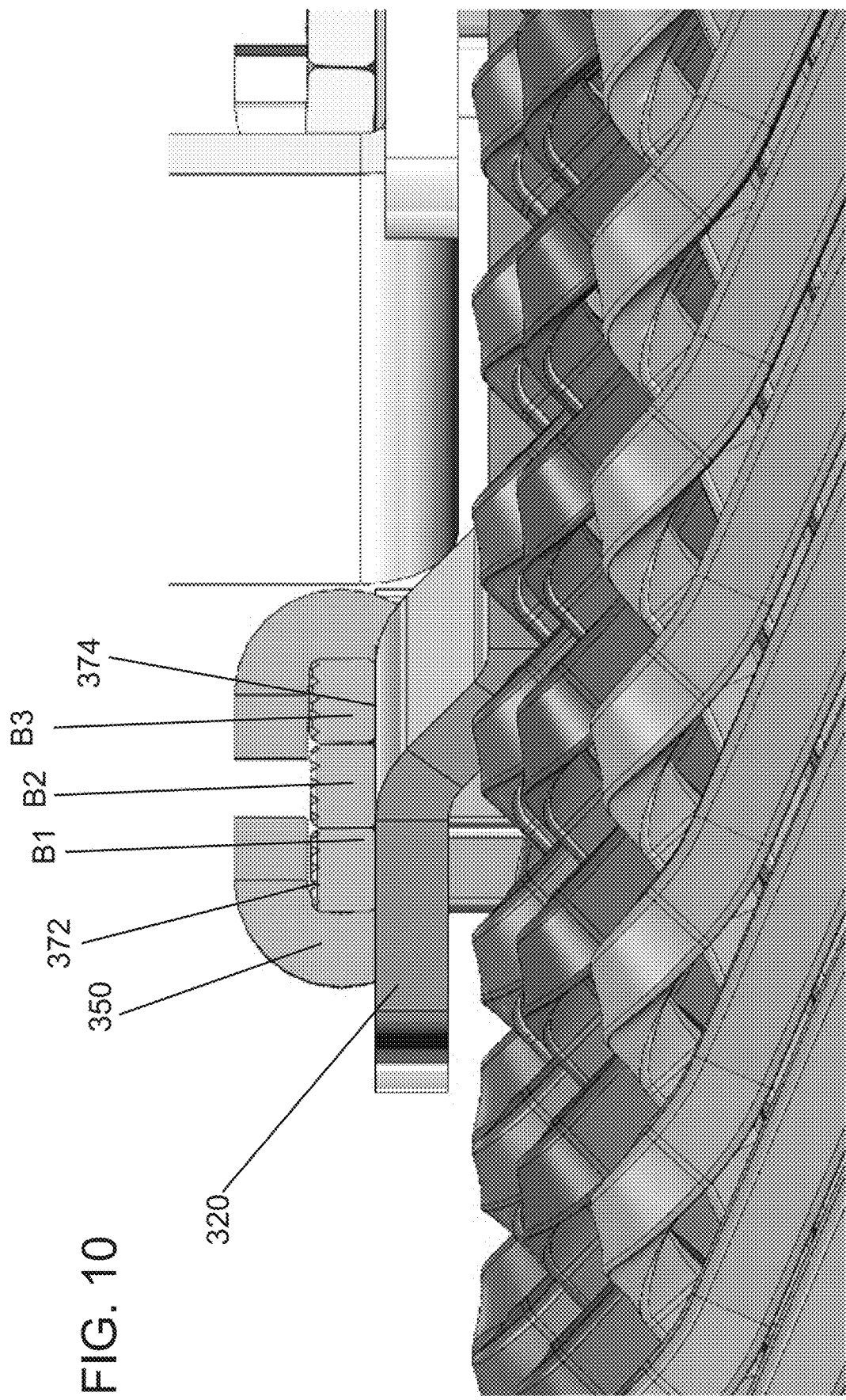

FIG. 7 illustrates an enlarged view of FIG. 6, showing a portion of the first phase lead bus bar 320 and the associated phase leads of conductors B1-B3. As described herein, the stator windings can form an L-shaped bend. The first segment of the stator windings can extend past the first end face 225A of the stator 205. In some embodiments, the first segment of the stator windings extends in a direction generally orthogonal to the first end face 225A of the stator. The second segment of the stator windings can lie in a plane extending generally parallel to a leg of the bus bar to which the second segment, or a portion thereof, is joined. FIG. 8 illustrates another view of the first phase lead bus bar 320 and the associated phase leads of conductors B1-B3. FIG. 9 illustrates a view of the first phase lead bus bar 320 and the phase lead of conductor B1. The additional clips 350 for the phase lead bus bars 330, 340 are shown. FIG. 10 illustrates another view of the first phase lead bus bar 320 and the associated phase lead of conductors B1-B3. The phase leads of conductors A1-A6, B4-B6, C1-C6 can include any of the features described herein with respect to the phase leads of conductors B1-B3. The neutral leads of the conductors A1'-A6', B1'-B6', C1'-C6' can include any of the features described herein with respect to the phase leads of conductors B1-B3.

Referring to FIGS. 7 and 8, the phase leads of conductors B1-B3, or a portion thereof, can include a surface modification to facilitate joining of the conductor B1-B3 to the first phase lead bus bar 320. Surface modifications of leads in accordance with systems and methods described herein can take a number of different forms. The phase leads of conductors B1-B3, or a portion thereof, can have a non-smooth surface. The phase leads of conductors B1-B3, or a portion thereof, can be roughened. The phase leads of conductors B1-B3, or a portion thereof, can include an irregular surface. The phase leads of conductors B1-B3, or a portion thereof, can include a surface marked by irregularities, protuberances, or ridges. The phase leads of conductors B1-B3, or a portion thereof, can include an uneven or coarse surface.

The phase leads of conductors B1-B3, or a portion thereof, can be knurled. A knurled surface can be produced by imparting a pattern of straight, angled, or crossed lines into the material of the phase lead. The knurled surface can be produced by cutting or rolling the pattern into the material. The knurled surface can include projections and indentations on the phase leads of conductors B1-B3, or a portion thereof. The non-smooth surface can alter the originally smooth metal surface of the phase leads of conductors B1-B3, or a portion thereof. The non-smooth surface can include any pattern which performs the function of reducing reflection of light incident on the non-smooth surface, such as laser light, as described herein.

Each of the phase leads of conductors B1-B3 can include one or more surfaces. The surfaces can extend along a portion of the phase leads of conductors B1-B3. In some embodiments, each of the phase leads of conductors B1-B3 can include a top surface 372 and a bottom surface 374 (not illustrated in FIG. 7 but illustrated in FIG. 9). The top surface 372 can be opposite to the bottom surface 374 that lies against the phase lead bus bar 320. The top surface 372 of the lead can be the furthest surface from the first end face 225A of the stator when viewed orthogonally to the first end face 225A. The bottom surface 374 of the lead can be the closest surface to the first end face 225A of the stator when viewed orthogonally to the first end face 225A. The bottom surface 374 can be designed to lie flat or generally flat on a portion of the first phase lead bus bar 320. The top surface 372 can be parallel to, but spaced apart from, the leg 322B of the first phase lead bus bar 320. The bottom surface 374 can be parallel to leg 322B of the first phase lead bus bar 320.

In some embodiments, the top surface 372 extends the entire top surface of each phase lead of conductors B1-B3. In some embodiments, the top surface 372 extends only a portion of the phase leads of conductors B1-B3. The top surface 372 can be positioned inward from the slot 324B when the stator windings are positioned within the slot 324B. The top surface 372 can be positioned inward from the clip 350 when the stator windings are held in position by the clip 350. The top surface 372 can be positioned inward from the bend of the L-shaped bend of the stator windings. The top surface 372 can extend inward from the end of the phase leads of the conductor B1-B3. The top surface 372 can extend along any portion of the phase leads of conductors B1-B3.

The top surface 372, or a portion thereof, can include the surface modification in accordance with systems and methods described herein. In some embodiments, only the top surface 372 can include the surface modification. The top surface 372 can include any non-smooth surface. The top surface 372 can be roughened. The top surface 372 can include any irregular surface. The top surface 372 can include any surface marked by irregularities, protuberances, or ridges. The top surface 372 can include any uneven or coarse surface. The top surface 372 can be knurled.

In some embodiments, bottom surface 374 can have a non-smooth surface. In some embodiments, bottom surface 374 can be knurled. In some embodiments, any surface of the phase leads of conductors B1-B3 can have a non-smooth surface. In some embodiments, any surface of the phase leads of conductors B1-B3 can be knurled. In some embodiments, all surfaces around a perimeter can have a non-smooth surface. In some embodiments, all surfaces around a perimeter of the phase leads of conductors B1-B3 can be knurled. The non-smooth surfaces described herein can include grooves, trenches, or indentations that extend from the top surface 372 towards the bottom surface 374. A bottom-most point of the groove, trench, or indentation can be located a distance from the top surface 372. The distance can be 10 percent, 20 percent, 30 percent, 40 percent, 50 percent, greater than 5 percent, greater than 10 percent, greater than 20 percent, etc., of the height of the lead (measured from a top-down perspective generally orthogonal to the end face of the stator).

Referring back to FIG. 6, the phase leads of conductors B1-B3 include a surface modification. The phase leads of conductors A1-A3, C1-C3 and the neutral lead of the conductor B4' have not been modified to include a surface modification in accordance with systems and methods described herein.

In some embodiments, an electric machine is provided. The electric machine can include a stator having a plurality of stator slots. The electric machine can include a plurality of stator windings placed within the plurality of stator slots. In some embodiments, each of the plurality of stator windings is a continuous winding comprising a plurality of leg portions each positioned in one of the plurality of stator slots and a plurality of crowns connecting successive leg portions of the plurality of leg portions, the crowns extending above the end face of the stator. In some embodiments, each of the plurality of stator windings has a lead extending beyond an end face of the stator.

The electric machine can include a bus bar in physical contact with a first surface of a lead of a stator winding of the plurality of stator windings. In some embodiments, the bus bar can include a planar branch, a leg extending from the planar branch, the leg having a slot sized to receive the lead of the stator winding, and a connection terminal extending from the planar branch for receiving one of three phases of electric current. In some embodiments, the bus bar can include a second leg extending from the planar branch, the second leg having a second slot sized to receive a lead of at least one of the plurality of stator windings. In some embodiments, the slot is sized to receive a single lead. In some embodiments, the slot is sized to receive three leads. The electric machine can include a second bus bar and a third bus bar, the bus bars positioned in a stack from a top-down perspective orthogonal to the end face of the stator.

In some embodiments, a second surface of the lead opposite the first surface includes a surface modification. In some embodiments, the surface modification comprises a knurled surface, a pattern of raised grooves stamped into the top surface, or a roughened surface. In some embodiments, the leg of the bus bar is in physical contact with the first surface of the lead of the stator winding. In some embodiments, the bus bar is in physical contact with the first surfaces of each of the three leads received in the slot. The electric machine can include a clip configured to hold the bus bar in physical contact with the first surface of the lead of the stator winding.

In some embodiments, the leads of a first subset of the plurality of windings are laser welded to the bus bar to receive a first phase of the three phases of electric current. In some embodiments, the leads of a second subset of the plurality of windings are laser welded to a second bus bar of the electric machine to receive a second phase of the three phases of electric current.

Overview of Methods of Joining

The configurations of the stator windings and the bus bar arrangement 300 described herein advantageously allow for joining of the stator windings and the bus bar arrangement 300 by laser welding. Laser welding in the absence of surface modification systems and methods described herein would be unsuitable for joining stator windings to bus bar arrangements. Laser welding is a process used to join one or more materials through application of energy from a laser, which can include but is not limited to infrared light. The laser delivers intense and concentrated energy to the leads of the stator windings. Stator windings that do not include surface modifications described herein have low absorptivity of the infrared light. Stator windings that do not include surface modifications described herein would fail to weld due to the low absorptivity. Stator windings that do not include surface modifications described herein would reflect the laser light to such a large extent that the application of high powered laser light could cause damage to components surrounding the stator winding and/or the laser. Applying laser light in the absence of surface modifications described herein would produce low viscosity of the copper melt, to the extent that a weld would not form, would be inoperative, or would be defective. In the absence of laser welding systems and techniques described herein, the high thermal conductivity of the stator windings would make it very difficult if not impossible to control the melt of the stator windings.

Laser welding techniques described herein address these and other issues by quickly, efficiently, and accurately welding surface-modified leads to the bus bar arrangement. As described herein, the leads of the conductors can be metallic. As described herein, the bus bar arrangement 300 including the first phase lead bus bar 320, the second phase lead bus bar 330, the third phase lead bus bar 340, and the neutral bus bars 310A-310F can be metallic. In some embodiments, the leads, the first phase lead bus bar 320, the second phase lead bus bar 330, the third phase lead bus bar 340, and the neutral bus bars 310A-310F comprise the same material. In some embodiments, the leads, the first phase lead bus bar 320, the second phase lead bus bar 330, the third phase lead bus bar 340, and the neutral bus bars 310A-310F comprise copper or a copper alloy.

Metals such as copper have a very high thermal and electrical conductivity. Metals such as copper can also be highly reflective. For instance, shining a light on certain metallic surfaces can cause nearly all or a significant portion of the light to be reflected back from the metallic surface, rather than absorbed by the metallic surface. The reflectivity of the metallic surface can prevent absorption of a significant portion of the laser light incident on the surface. As one example, the reflectivity can prevent absorption of 80% of the incident laser light, 90% of the incident laser light, greater than 90% of the incident laser light, greater than 95% of the incident laser light, greater than 98% of the incident laser light, etc. In some cases, absorption of the incident laser light on a copper surface can be as low as 2% to 3% based on high surface reflectivity. The reflectivity can deflect such a substantial portion of the incident light that the materials are not heated enough to form a weld or to form an operative weld. The reflectivity can damage surrounding components, such as by directing a high powered beam of light back toward the laser or other components of the electric machine.

Embodiments of stator windings described herein have leads that include a surface modification. The phase leads of conductors A1-A6, B4-B6, C1-C6, or a portion thereof, can include a surface modification to enable laser welding of the phase leads of the conductors A1-A6, B4-B6, C1-C6 to the first phase lead bus bar 320, the second phase lead bus bar 330, and the third phase lead bus bar 340. The neutral leads of the conductors A1'-A6', B4'-B6', C1'-C6', or a portion thereof, can include a surface modification to enable laser welding of the neutral leads of the conductors A1'-A6', B4'-B6', C1'-C6' to the neutral bus bar. The leads can include the top surface 372. The top surface 372 can have a surface modification including a non-smooth surface. In one example, the top surface 372 can be knurled. The surface modification of the top surface 372 can reduce the reflectivity of the metal to enable laser welding of the lead to the corresponding bus bar. The surface modification of the top surface 372 can provide for a more controlled melt of the material during laser welding. The surface modification of the top surface 372 can provide a neater melt of the material. As one example, the top surface 372 can contain melted material within the indentations of the surface after laser welding.

The method of joining can including one or more of the following steps. The method can include the step of preparing a stator winding. The method can include the step of applying an electrically insulating coating to a conductor of the stator winding. The method can include the step of applying an electrically insulating coating to a copper conductor of the stator winding. The method can include the step of preparing a lead. The method can include the step of exposing a portion of the stator winding from the electrically insulating coating. The method can include the step of exposing a portion of the stator winding such that the lead of the stator winding can form an electrical connection with a phase lead bus bar. The method can include the step of exposing a portion of the stator winding such that the lead of the stator winding can form an electrical connection with a neutral bus bar.

The method can include the step of placing the stator winding within a stator slot of a stator. The method can include the step of placing the stator winding within the stator according to a winding pattern. The method can include the step of placing the stator winding within the stator such that the lead extends beyond a face of the stator. The method can include the step of placing the stator winding within the stator such that the lead is adjacent to one or more leads of other stator windings of the same phase installed in the stator. The method can include the step of placing the stator winding within the stator such that the two or more leads of a phase are adjacent.

The method can include the step of bending the stator winding. The method can include the step of forming a bend in the lead of stator winding. The method can include the step of forming an L-shaped bend. The method can include the step of forming a bend such that two straight or substantially straight segments of the stator winding are perpendicular. The method can include the step of forming a bend such that a lead of the stator winding is perpendicular to a straight segment of the stator winding. The method can include the step of bending the stator winding before placing the stator winding within the stator slot. The method can include the step of bending the stator winding after placing the stator winding within the stator slot.

The method can include the step of placing the stator winding in a slot of a phase lead bus bar. The method can include the step of placing the stator winding in a slot of a neutral bus bar. The method can include the step of placing the stator winding in the slot after bending the stator winding. The method can include the step of placing the stator winding between two projections of a phase lead bus bar or a neutral bus bar. The method can include the step of placing the bend of the stator winding between two projections of a phase lead bus bar or a neutral bus bar.

The method can include the step of clipping the stator winding to the phase lead bus bar. The method can include the step of clipping one or more stator windings to the phase lead bus bar. The method can include the step of clipping three stator windings to the phase lead bus bar. The method can include the step of clipping the stator winding to the neutral bus bar. The method can include the step of maintaining the position of the stator winding relative to the phase lead bus bar. The method can include the step of maintaining the position of the stator winding relative to the phase lead bus bar before welding. The method can include the step of maintaining the position of the stator winding relative to the neutral bus bar. The method can include the step of maintaining the position of the stator winding relative to the neutral bus bar before welding.

The method can include the step of modifying the lead. The method can include the step of modifying a surface of the lead. The method can include the step of modifying only a portion of the perimeter of the lead. The method can include the step of modifying only a portion of the surface area of an external face of the lead. The method can include the step of modifying a top surface of the lead. The method can include the step of placing a bottom surface of the lead adjacent to the phase lead bus bar. The method can include the step of placing a bottom surface of the lead adjacent to the neutral bus bar. The method can include the step of modifying a surface of the lead before placing the lead in the slot. The method can include the step of modifying a surface of the lead before bending the stator winding. The method can include the step of modifying a surface of the lead before placing the lead between two projections. The method can include the step of modifying a surface of the lead before clipping the lead to a corresponding bus bar.

The method can include the step of forming a non-smooth surface on the lead. The method can include the step of forming an irregular surface on the lead. The method can include the step of forming one or more ridges on the lead. The method can include the step of creating a series of projections and indentions on the lead. The method can include the step of forming an uneven surface on the lead. The method can include the step of forming a knurled surface on the lead. The method can include the step of imparting a pattern of lines on a surface of the lead. The method can include the step of cutting a pattern into the lead. The method can include the step of stamping a pattern into the lead. The method can include the step of altering the originally smooth surface of the lead.

The method can include the step of laser welding. The method can include the step of applying laser light energy to the lead. The method can include the step of applying laser light energy to the modified lead. The method can include the step of applying laser light energy to the top surface of the lead. The method can include the step of applying laser light energy to the non-smooth surface of the lead. The method can include the step of applying laser light energy to the irregular surface of the lead. The method can include the step of applying laser light energy to the uneven surface of the lead. The method can include the step of applying laser light energy to the knurled surface of the lead. The method can include the step of applying laser light energy to the patterned surface of the lead.

The method can include the step of forming a weld using laser light. The method can include the step of forming a weld between the lead and the phase lead bus bar using laser light. The method can include the step of forming a continuous weld between the lead and the phase lead bus bar using laser light. The method can include the step of forming a continuous weld between the leads of three stator windings and the phase lead bus bar using laser light. The method can include the step of forming a tip weld between the lead and the phase lead bus bar using laser light. The method can include the step of forming a weld between the lead and the neutral bus bar using laser light. The method can include the step of forming a continuous weld between the lead and the neutral bus bar using laser light. The method can include the step of forming a tip weld between the lead and the neutral bus bar using laser light.

The method can include the step of forming a weld using laser light with adequate penetration between parts. The method can include the step of forming a weld using laser light comprising only copper. The method can include the step of forming a weld using laser light between two copper components of the stator assembly. The method can include the step of forming a weld using laser light that cools instantaneously or nearly instantaneously. The method can include the step of forming a weld between a stator winding and a bus bar using laser light, where the weld generates almost no heat. The method can include the step of forming a weld using laser light wherein the parts can be handled immediately after welding. The method can include the step of forming a weld using laser light with minimal heat generation. The method can include the step of forming a weld using laser light without distorting the stator winding. The method can include the step of forming a weld using laser light without distorting the phase lead bus bar. The method can include the step of forming a weld using laser light without distorting the neutral bus bar. The method can include the step of forming a weld without solder. The method can include the step of forming a weld without a consumable electrode. The method can include the step of forming a weld without mechanical contact between the welding apparatus and the components being welded together. The method can include the step of forming a weld without a vacuum. The method can include the step of forming a weld suitable for high production manufacturing.

In some embodiments, a method of joining a stator winding to a bus bar of a stator is provided. The method can include the step of positioning a lead of a stator winding beyond an end face of a stator. In some embodiments, the stator winding can extend orthogonal to the end face of the stator.

The method can include the step of bending the stator winding to position a portion of the lead of the stator winding in contact with a bus bar. In some embodiments, bending the stator winding includes bending the stator winding to be parallel or generally parallel to the end face of the stator. In some embodiments, bending the stator winding comprises forming an L-shaped bend in the stator winding. The method can include the step of clipping the portion of the lead in contact with the bus bar to the bus bar.

The method can include the step of modifying a surface of the lead, the modified surface opposite the portion of the lead in contact with the bus bar. In some embodiments, the surface is a top surface of the lead. In some embodiments, the lead can be the end of a stator winding that is exposed from an insulator. In some embodiments, the portion of the lead that is modified is approximately 5 percent of the surface area of the lead, 10 percent of the surface area of the lead, 15 percent of the surface area of the lead, 20 percent of the surface area of the lead, 25 percent of the surface area of the lead, 30 percent of the surface area of the lead, 40 percent of the surface area of the lead, 50 percent of the surface area of the lead, etc. In some embodiments, the lead has a polygonal perimeter having one or more sides (e.g., triangle, square, rectangle, hexagonal, etc.). In some embodiments, the surface is a side of the lead or a portion of a side of the lead. In some embodiments, the lead is positioned relative to a bus bar. In some embodiments, the surface faces upward from the end face of the stator. In some embodiments, the surface is visible from a direction orthogonal to the end face of the stator. In some embodiments, modifying a surface of the lead comprises knurling the surface.

The method can include the step of laser welding the lead of the stator winding to the bus bar. In some embodiments, laser welding the lead of the stator winding to the bus bar does not comprise applying solder to the stator winding. In some embodiments, negligible heat is generated when the stator winding is laser welded to the bus bar. In some embodiments, the lead of the stator winding comprises metal. In some embodiments, the lead of the stator winding comprises copper.

The methods of welding described herein can have particular advantages for bus bar arrangement. In some embodiments, the process of laser welding the conductor and the bus bar arrangement does not require mechanical force or contact between parts. For instance, it would be difficult to apply mechanical or direct force contact between a welding apparatus and both the lead and the bus bar arrangement as a result of the geometry of the stator. Appropriate space would be required for the equipment and the fixture, which may not be available in the stator. Advantageously, embodiments of the process of laser welding the conductor and the bus bar arrangement described herein do not require direct force contact.

In some embodiments, the process of laser welding the conductor and the bus bar arrangement described herein does not require a complex setup for each weld. Rather, the laser apparatus can be easily moved between adjacent slots. The process of laser welding the conductor and the bus bar arrangement allows for a continuous weld, in addition to a tip/ball weld. In some embodiments, the process of laser welding does not require a consumable such as an electrode or solder. In some embodiments, the process of laser welding the conductor and the bus bar arrangement does not use a consumable material. In some embodiments, the process of laser welding does not require a shielding gas, such as a shielding gas to prevent oxidation. In some embodiments, the process of laser welding the conductor and the bus bar arrangement does not require a vacuum. In some embodiments, the process of laser welding the conductor and the bus bar arrangement does not require loading the stator, conductors, and the bus bar arrangement into a chamber, such as a vacuum chamber.

In some embodiments, the process of laser welding the conductor and the bus bar arrangement described herein generates a negligible amount of heat. The process of laser welding the conductor and the bus bar arrangement can produces a small heat affect zone. The heat affect zone can be limited to the surface area of the top surface. The heat affect zone can be limited to the cross-sectional area of the knurled surface. The energy generation can localized to the top surface. In some embodiments, the process of laser welding the conductor and the bus bar arrangement does not require time to cool down after the weld. In some embodiments, the process of laser welding the conductor and the bus bar arrangement does not produce deformation of the conductors or bus bar arrangement. The process of laser welding the conductor and the bus bar arrangement does not produce deformation due to excess heat generation. The process of laser welding the conductor and the bus bar arrangement does not produce deformation due to vibration. The process of laser welding the conductor and the bus bar arrangement does not produce warp, such as when the part cools in a different shape.

In some embodiments, the process of laser welding is appropriate for high volumes, for instance for welding a plurality of leads to the bus bar arrangement. The process of laser welding the conductor and the bus bar arrangement described herein is suitable for the size of the parts, for instance the thin, cross-sectional area of the leads. The methods of welding described herein can be repeatable, reliable, and reproducible. The methods of welding described herein can be fast and suitable for a high production rate.

Implementing Systems and Terminology

Implementations disclosed herein provide a bus bar arrangement including phase leads and neutral leads of the conductors laser welded to the phase lead bus bars and the neutral bus bar. Methods for joining phase leads and neutral leads of the conductors to the phase lead bus bars and the neutral bus bar are also disclosed.

The systems and methods above have been described in general terms as an aid to understanding details of preferred embodiments of the present invention. Other preferred embodiments of the present include the described application for electric vehicles. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. As used herein, the term "plurality" denotes two or more. For example, a plurality of components indicates two or more components. The phrase "based on" does not mean "based only on," unless expressly specified otherwise. In other words, the phrase "based on" describes both "based only on" and "based at least on."

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An electric machine comprising:
a stator having a plurality of stator slots;
a plurality of stator windings placed within the plurality of stator slots, each of the plurality of stator windings having a lead extending beyond an end face of the stator; and
a bus bar in physical contact with a first surface of a lead of a stator winding of the plurality of stator windings, wherein a second surface of the lead opposite the first surface comprises a surface modification relative to the first surface, the bus bar comprising a bus bar slot sized to receive the lead and configured to physically and electrically couple to a bend in the lead of the stator winding.

2. The electric machine of claim 1, wherein the surface modification comprises a knurled surface, a pattern of raised grooves stamped into the top surface, or a roughened surface.

3. The electric machine of claim 1, wherein the bus bar comprises:
   a planar branch;
   a leg extending from the planar branch, the leg having the bus bar slot sized to receive the lead of the stator winding; and
   a connection terminal extending from the planar branch for receiving one of three phases of electric current.

4. The electric machine of claim 3, wherein the leg of the bus bar is in physical contact with the first surface of the lead of the stator winding.

5. The electric machine of claim 3, wherein leads of a first subset of stator windings of the plurality of stator windings are laser welded to the bus bar to receive a first phase of the three phases of electric current, and wherein leads of a second subset of the plurality of windings are laser welded to a second bus bar of the electric machine to receive a second phase of the three phases of electric current.

6. The electric machine of claim 3, wherein the bus bar comprises a second leg extending from the planar branch, the second leg having a second bus bar slot sized to receive a second lead of at least one second stator winding of the plurality of stator windings.

7. The electric machine of claim 1, wherein the bus bar slot is sized to receive a single lead.

8. The electric machine of claim 1, wherein the bus bar slot is sized to receive three leads, and wherein the bus bar slot is in physical contact with first surfaces of each of the three leads received in the bus bar slot.

9. The electric machine of claim 1, further comprising a clip configured to hold the bus bar in physical contact with the first surface of the lead of the stator winding.

10. The electric machine of claim 1, further comprising a second bus bar and a third bus bar, the bus bars positioned in a stack from a top-down perspective orthogonal to the end face of the stator.

11. The electric machine of claim 1, wherein each of the plurality of stator windings is a continuous winding comprising a plurality of leg portions each positioned in one of the plurality of stator slots and a plurality of crowns connecting successive leg portions of the plurality of leg portions, the crowns extending above the end face of the stator.

* * * * *